May 22, 1956  J. W. HENDRY  2,746,089
METHOD FOR WORKING SYNTHETIC ORGANIC PLASTIC MATERIALS
Original Filed May 18, 1949  10 Sheets-Sheet 1
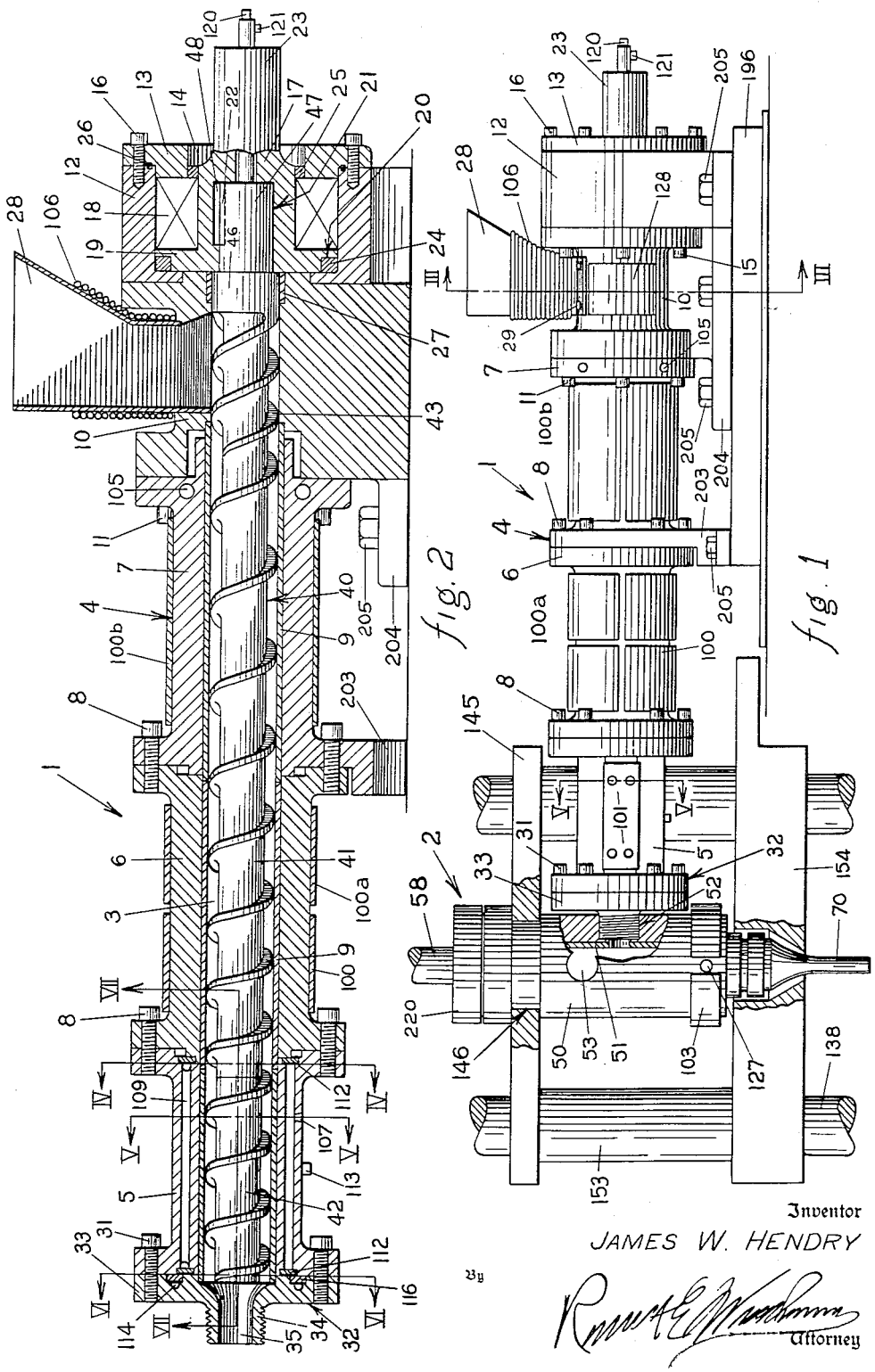
Inventor
JAMES W. HENDRY May 22, 1956  J. W. HENDRY  2,746,089
METHOD FOR WORKING SYNTHETIC ORGANIC PLASTIC MATERIALS
Original Filed May 18, 1949  10 Sheets-Sheet 2
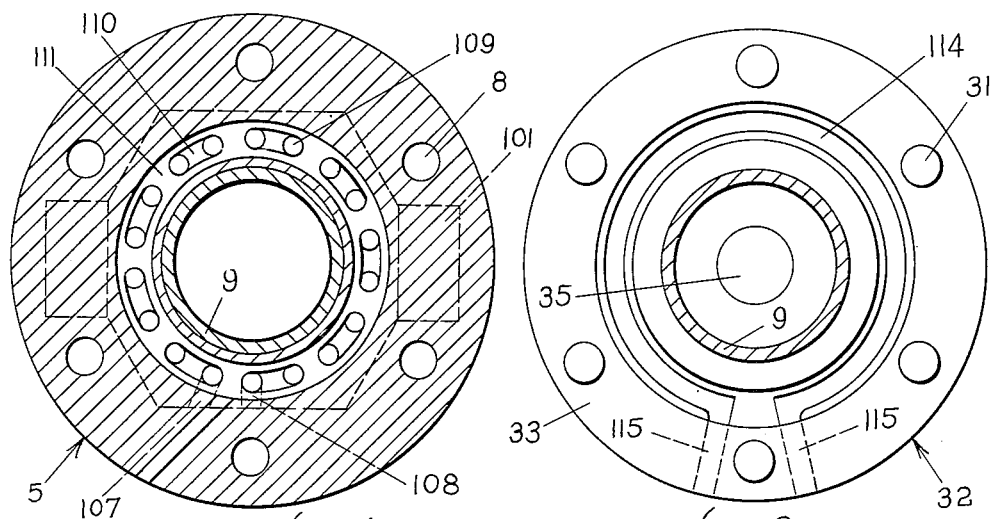
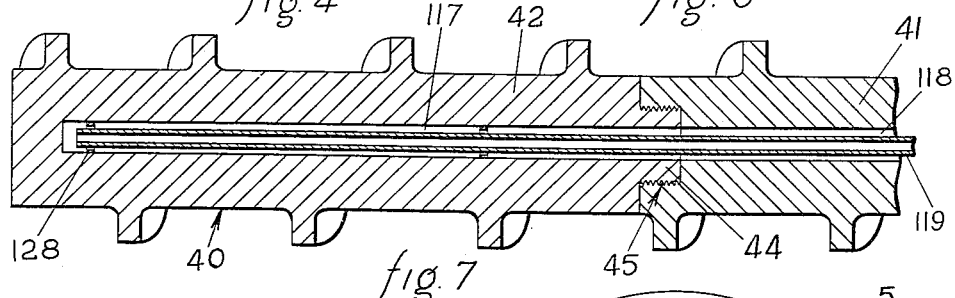
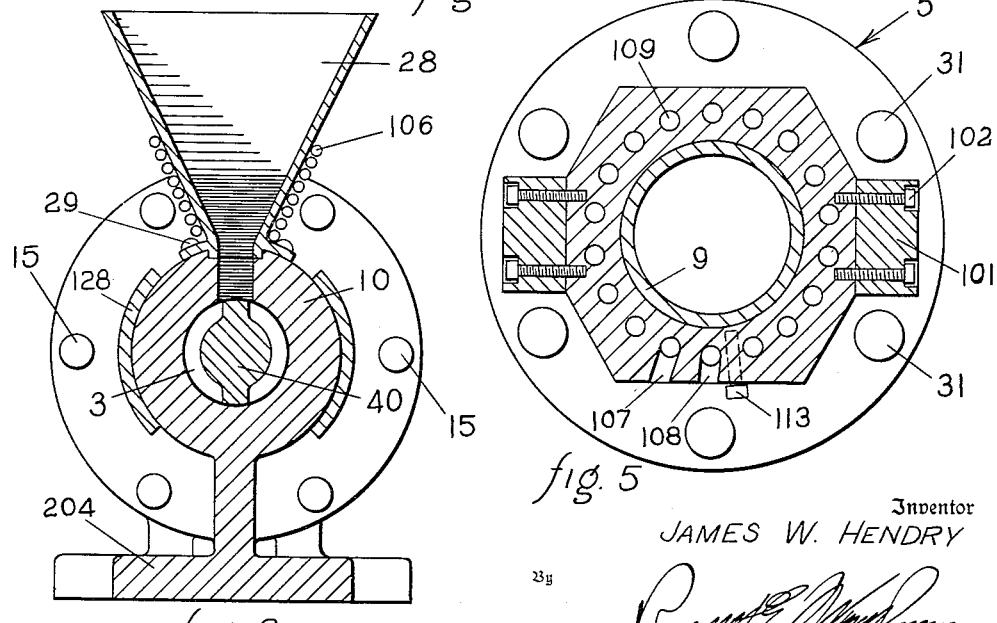
Inventor
JAMES W. HENDRY
Attorney May 22, 1956   J. W. HENDRY   2,746,089
METHOD FOR WORKING SYNTHETIC ORGANIC PLASTIC MATERIALS
Original Filed May 18, 1949   10 Sheets-Sheet 3
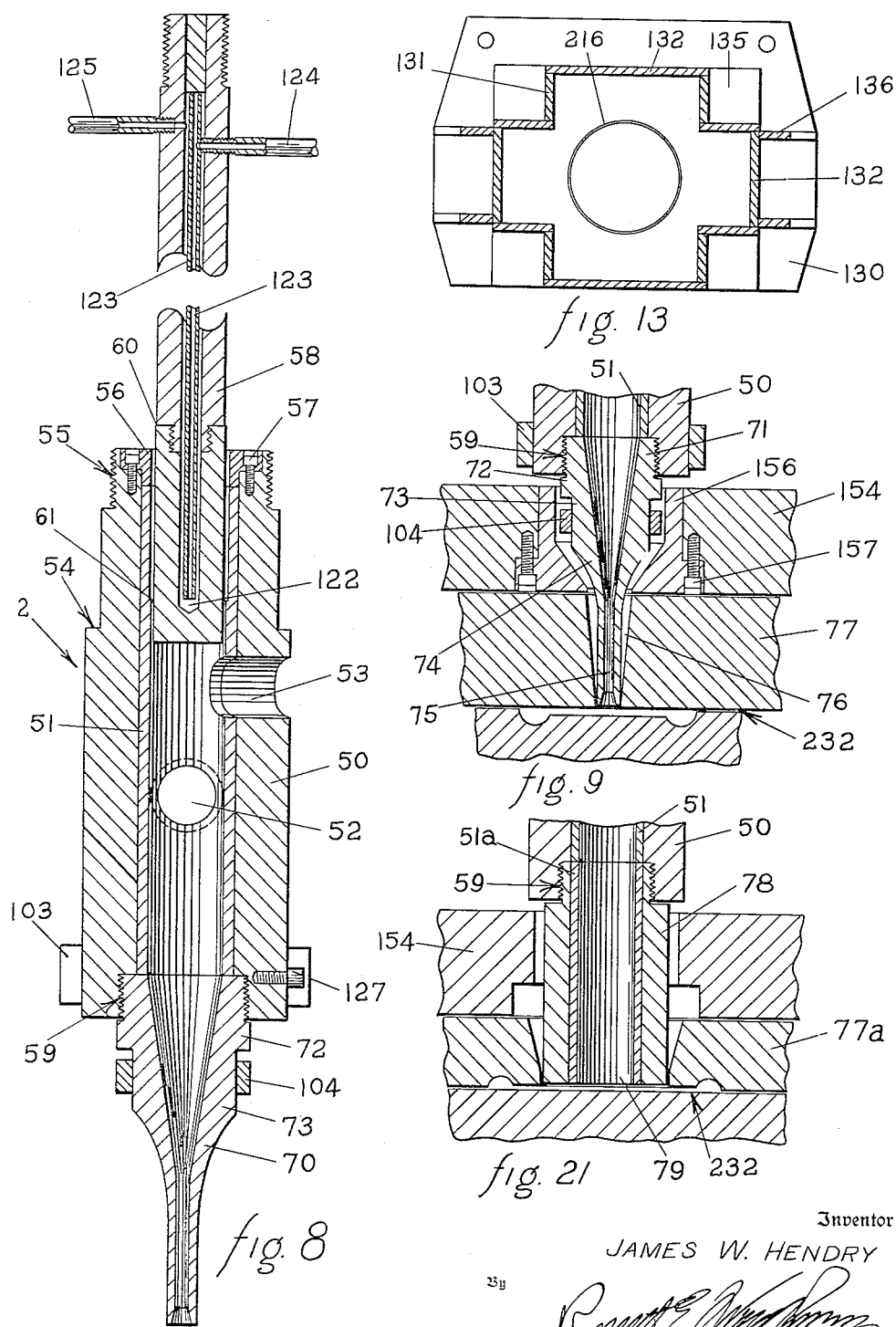
Inventor
JAMES W. HENDRY
By
Attorney

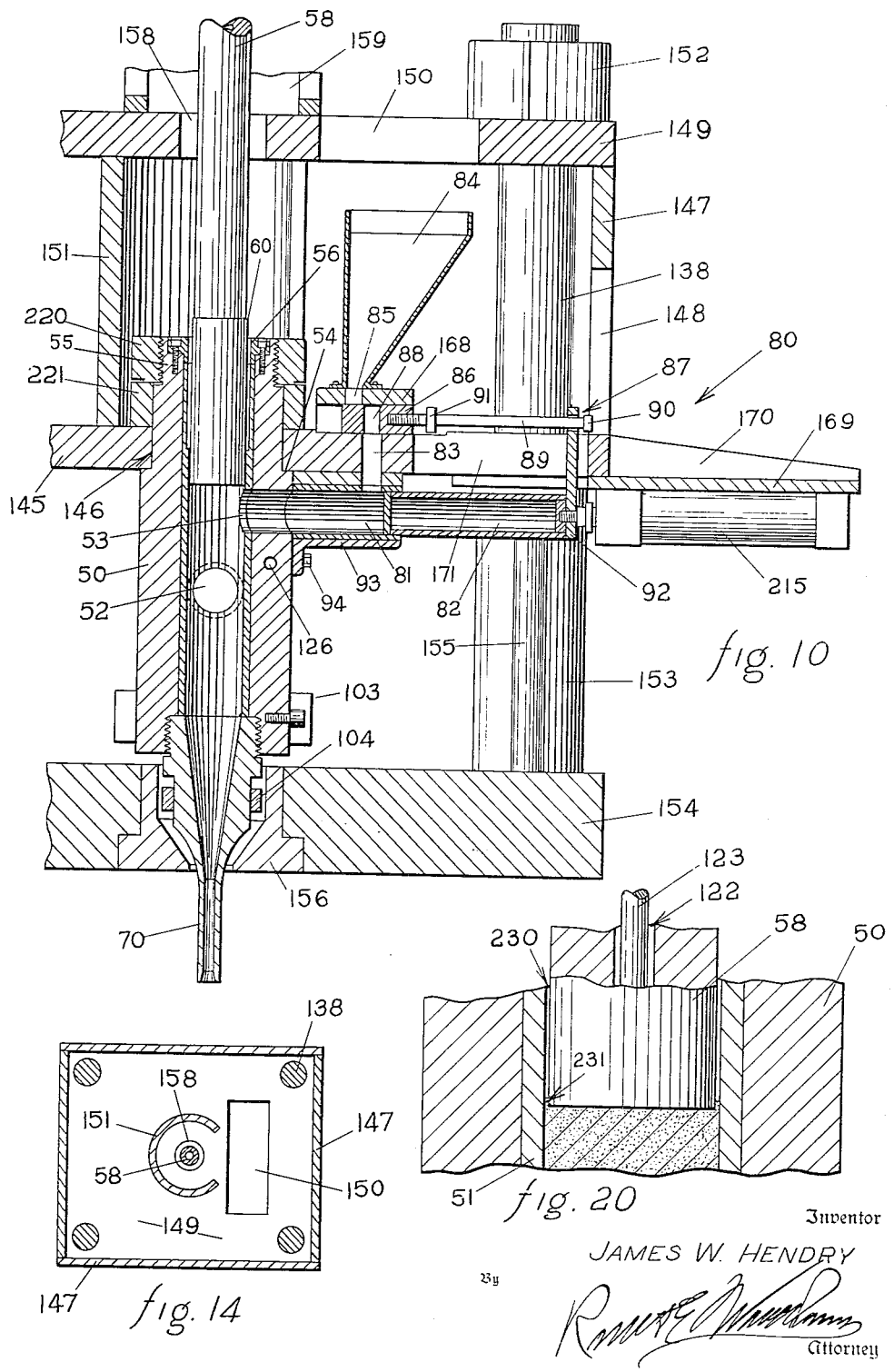

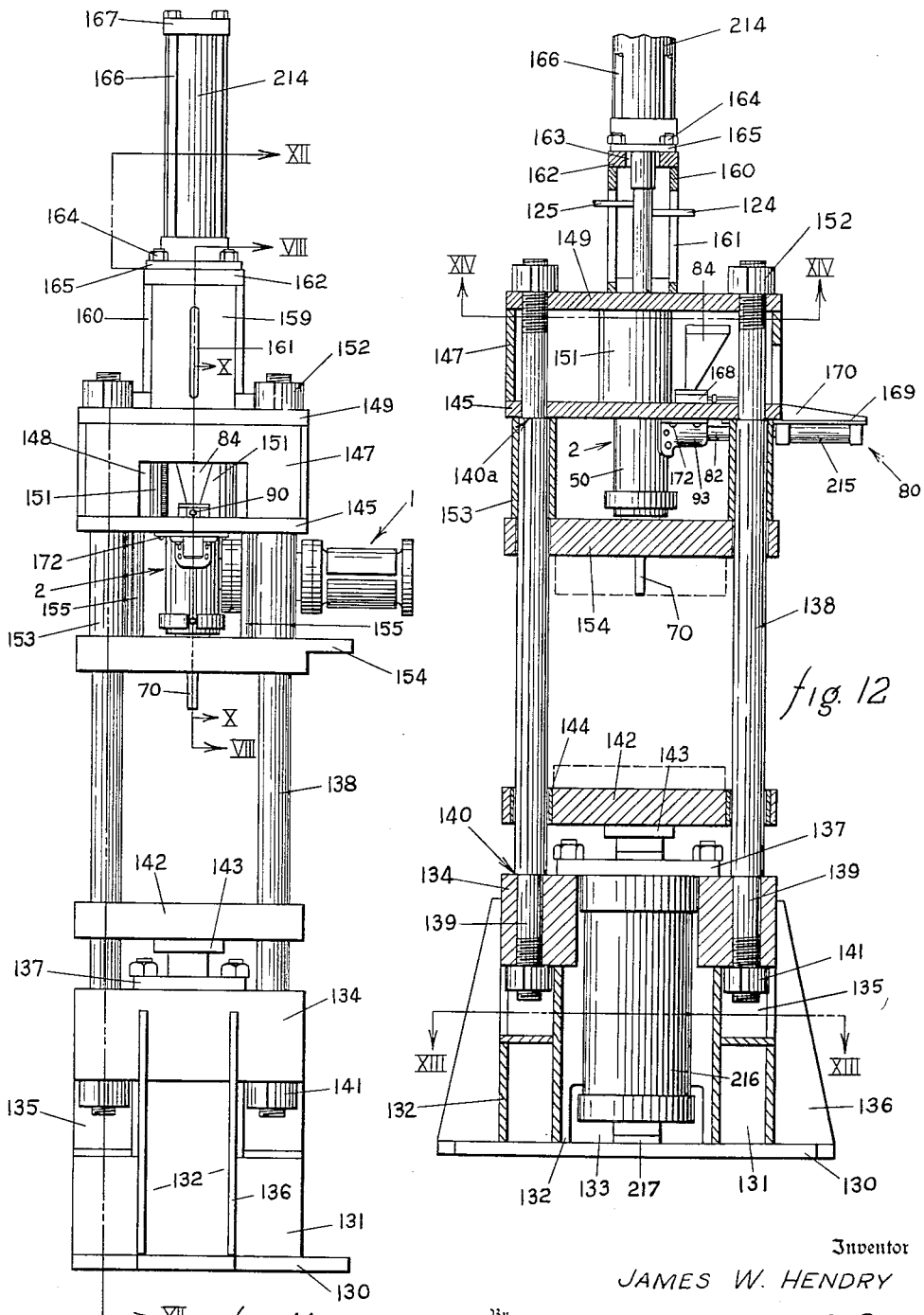

May 22, 1956      J. W. HENDRY      2,746,089
METHOD FOR WORKING SYNTHETIC ORGANIC PLASTIC MATERIALS
Original Filed May 18, 1949      10 Sheets-Sheet 6

Inventor
JAMES W. HENDRY
Attorney

May 22, 1956     J. W. HENDRY     2,746,089
METHOD FOR WORKING SYNTHETIC ORGANIC PLASTIC MATERIALS
Original Filed May 18, 1949     10 Sheets-Sheet 7
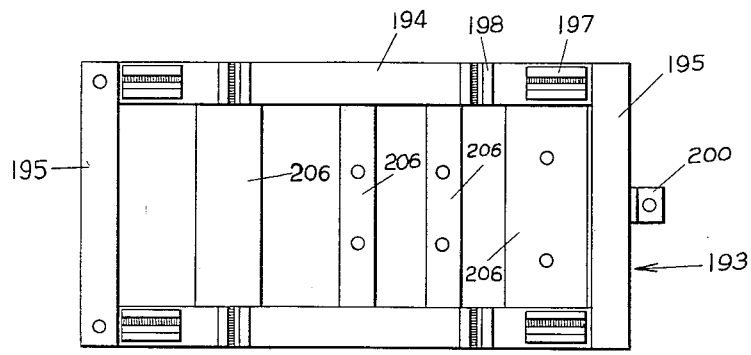
fig. 17
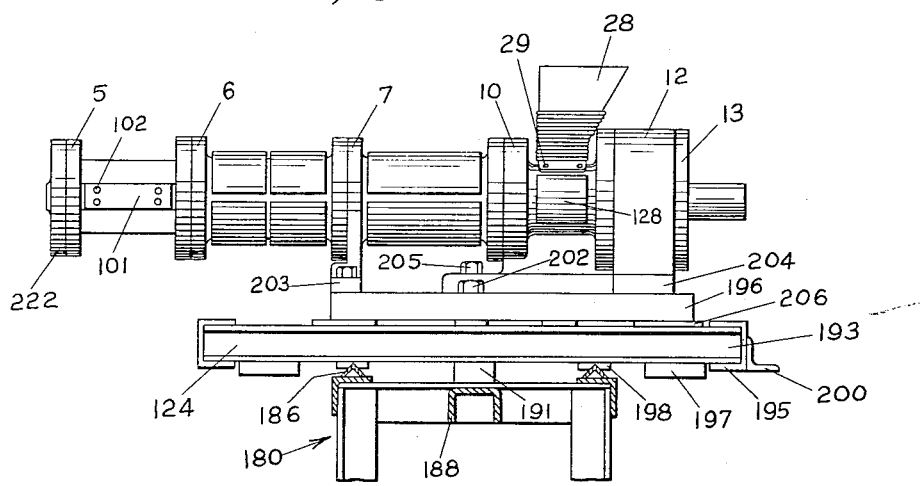
fig. 19
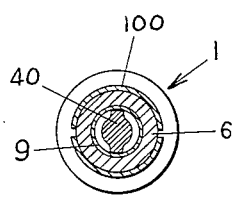
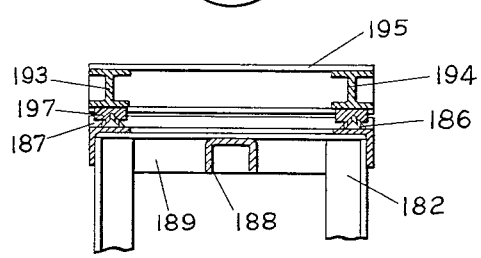
fig. 18
Inventor
JAMES W. HENDRY
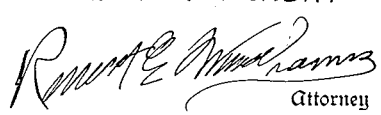
Attorney

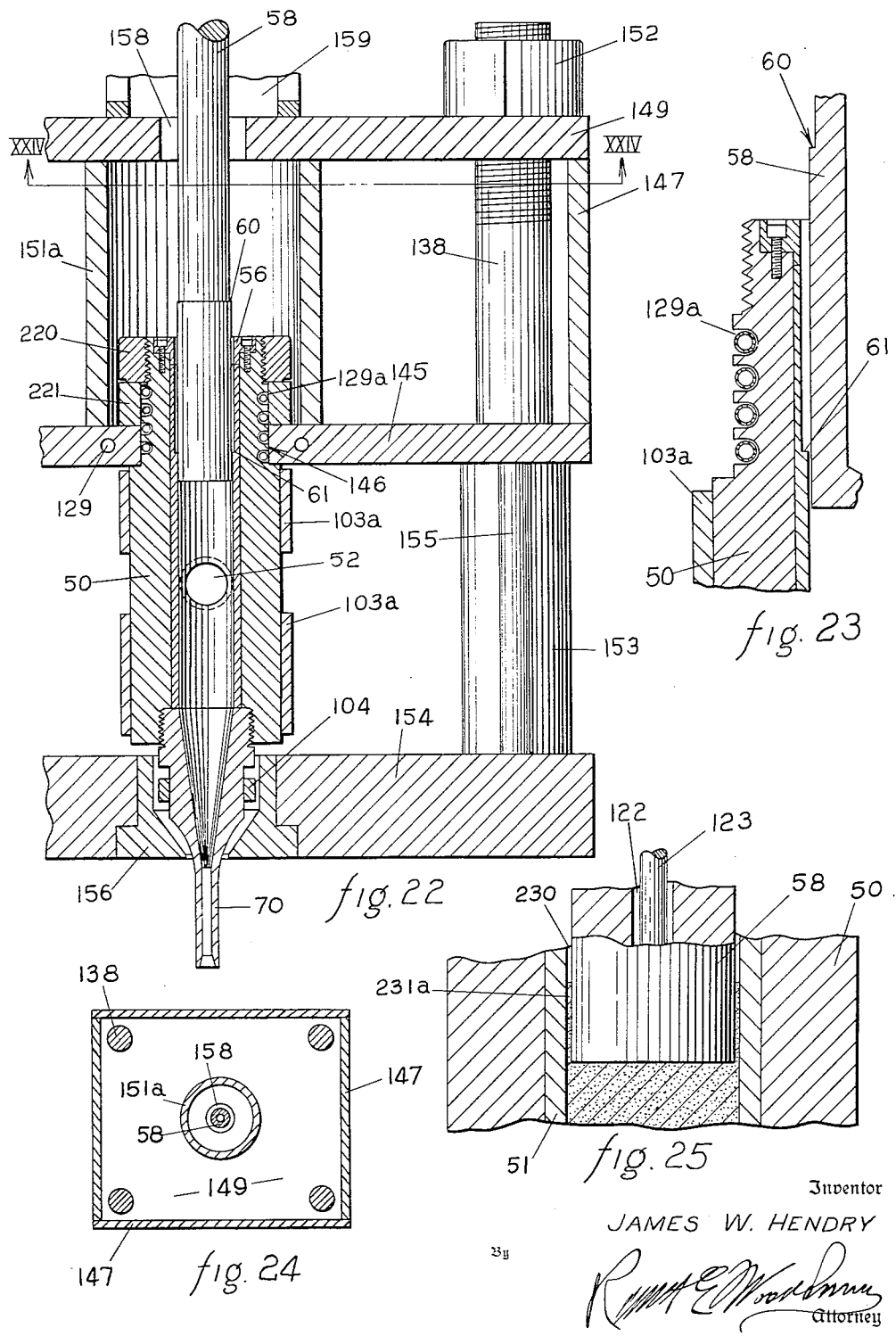

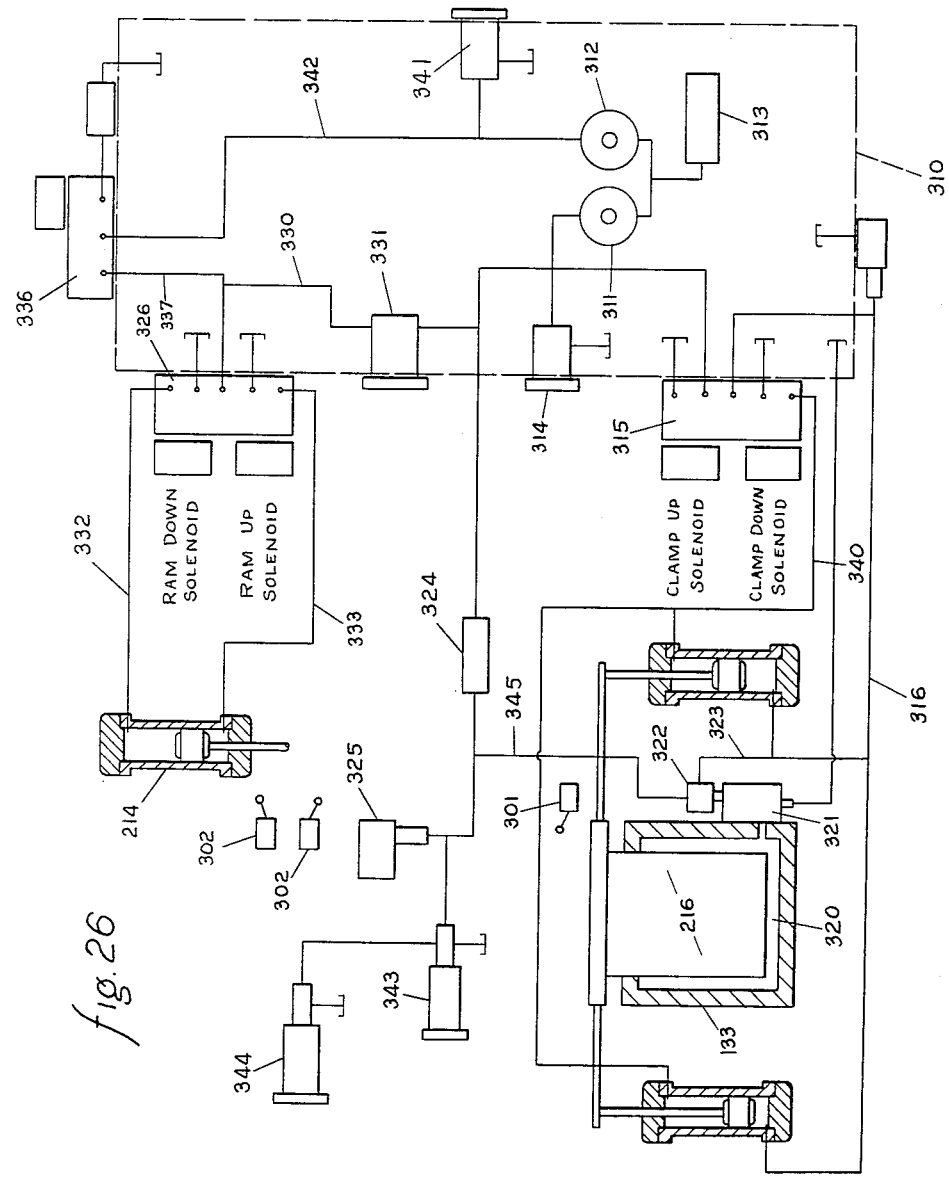

United States Patent Office 2,746,089
Patented May 22, 1956

2,746,089

METHOD FOR WORKING SYNTHETIC ORGANIC PLASTIC MATERIALS

James W. Hendry, Bay City, Mich., assignor, by mesne assignments, to Tube Turns Plastics, Inc., Louisville, Ky., a corporation of Delaware Original application May 18, 1949, Serial No. 93,935. Divided and this application December 14, 1950, Serial No. 207,495

9 Claims. (Cl. 18—55)

This invention relates to a method for working moldable materials, and more particularly to a method designed to prepare a synthetic organic resin, or natural or synthetic rubber, for extrusion, injection, compression or other molding and applicable to both thermoplastic and thermosetting types of materials.

Fundamentally, when utilized, for example, for injection or compression molding, the machine uses, in sequence, a screw for initially working and compressing the plastic material and a ram to complete the working and to force it into the mold in combination with a coordinated heating and cooling system. When used as an extruder the screw only is employed. Although the use of a screw or of a ram and, in some cases, even of the two items in combination is old, the method of use of the combination, as herein disclosed, is new.

Because of the differences in physical properties it has heretofore been necessary to provide two different types of methods for the working of thermoplastic and thermosetting plastic materials. The duplication of expensive machinery and the necessity for greater factory space have thus added materially to the manufacturing costs of plastic items. This has attracted much attention to the problem of unifying the machines handling these two types of materials and many efforts have been made to solve this problem, but, previous to my invention, these efforts have been unsuccessful.

One of the primary obstacles to the development of a single process for working both thermoplastic and thermosetting plastic materials is the difference in basic character of these materials. Thermoplastic materials harden upon cooling, but reheating will render them again soft since they undergo no chemical reactions. They may be heated to any temperature below that at which they will decompose without danger of injurious, or other permanent, effect. On the other hand, thermosetting plastics, once heated beyond a certain temperature, polymerize and thereafter become permanently set and cannot again be reworked or reused. Because of this difference in characteristics, it has heretofore been conventional practice to slowly heat and compress thermoplastics by means of a screw. At the same time, thermosetting plastic materials were treated by means of a rapid heating process such as that obtained by use of electrical induction heaters. My method overcomes the difficulties caused by use of both types of plastic materials in a single machine by treating both types to an extended period of preheating, each accompanied by careful temperature control.

Although my method operates with equal facility and effectiveness upon either thermoplastic or thermosetting plastic materials including rubber, some of the problems involved are common to both types of material and some are peculiar to only one or the other type. In the following discussion, the problems common to both materials will be discussed first and then followed, separately, by discussions of those specific to thermoplastic materials and those specific to thermosetting plastic materials.

A problem which has been of concern in processing plastics has been the proper conditioning of the material prior to molding. It is essential that the material be thoroughly and completely heated to a substantially constant temperature throughout its mass. Affecting this result is a matter of elapsed time, since the temperature of the heat source cannot be raised materially above that of the material without danger of overheating the portion of the material adjacent the heat source. This is true despite provision of means for keeping the mass in constant motion. The problem of providing sufficient time to effectuate thorough heating raises problems within itself. The standard and most effective method for working, mixing, and compressing the material while heating involves a screw within a tube, the screw having a progressively decreasing pitch and the tube being equipped with a restrictor or torpedo at its discharge end. In the following discussion of my invention, the use of the screw and torpedo are considered problems common to both thermoplastic and thermosetting plastic materials, since my invention utilizes a screw for both materials and the problem of effective preheating is common to both materials. The heating period may be increased by extending the screw, but this expedient is limited by the tendency of the screw to bend when increased beyond a certain length in relation to its diameter and by the increased cost of the machine.

The torpedo itself has many disadvantages, even when used with the thermoplastic materials for which it was designed. Not the least of these disadvantages is the necessity of excessively high pressures to force the material through the narrow passageway created by the torpedo. Another disadvantage is the fact that the torpedo provides no means for mixing the material as it is passed through the restricted passageway with the result that the material in contact with the heated surface remains the only material in contact with that surface throughout the entire length of the passageway. The principle of the torpedo is to apply heat at a high temperature to a thin cross section of material over a short period of time. My machine reverses this principle and applies heat at a lower temperature to a constantly agitated mass of material over an extended period of time. By elimination of the torpedo my process makes it possible to handle both thermoplastic and thermosetting plastic materials and to treat them in the preheating chamber without the necessity of a constant discharge to prevent excessive heating.

A further advantage of this elimination of the torpedo, and certain other attributes of my process, is that it makes possible a greatly reduced operating pressure. Whereas conventional injection machines operate at from 20,000 p. s. i. to 30,000 p. s. i. exerted by the ram, my process can be carried out in a wholly satisfactory manner with approximately 2,800 p. s. i. exerted by the ram. It is obvious that the power requirements, weight of the machine and wear on the operating parts are in this manner very greatly reduced.

My invention further overcomes the difficulty of careful heat control by providing a heating and cooling system, coordinated in operation, for closely controlling the material temperature while permitting a sufficient lapse of time to insure even and thorough heating to the desired temperature. A further arrangement is provided by which the final application of heat is effected while it is confined to a narrow passageway as it enters the ejection tube from the ram chamber to the mold. This construction not only permits the machine to be more compact but also provides the material with its maximum heat as it enters the narrow tube where the danger of cold slug formation is greatest.

It has long been known that the size, complexity and cost of machines designed to handle thermoplastic materials could be greatly reduced provided the material could be heated to a high temperature before application of the ram. Material so heated is more fluid and thus requires less pressure to inject it into the mold. Attempts at high temperature preheating have heretofore been unsuccessful because the material in the fluid condition at such temperatures, often passed upwardly between the ram and the cylinder wall where it chilled and hardened. This locked the ram causing damage to the machine and extended delays while the material was removed. The pressures necessary to effect injection of the plastic material are such that the material will frequently work into this space even though the clearance between the ram and walls is very slight. Because of this difficulty, the heretofore existing injection machines for thermoplastic materials have not heated the material to a highly fluid condition but have increased the pressure exerted by the injecting ram to compensate for the high viscosity of the material. My invention permits the material to be heated to a highly fluid state but provides means to prevent the material from fouling and locking the ram, thus allowing the use of lower pressures for operating the ram.

A further problem has arisen from the necessity for thorough cleaning of the entire interior of the machine whenever the machine's operations are halted for any appreciable period of time or when changing from one plastic material to another. Unless the machine is designed for easy disassembly, this becomes a long and costly operation. My design permits the machine to be broken down, section by section, both quickly and simply. This not only facilitates cleansing but greatly reduces the time necessary for replacement of worn and broken parts. Further, the size and complexity of each unit is reduced, effecting a saving in unit replacement costs.

Referring specifically to the molding of thermoplastic materials the problem of waste due to the excessive amount of sprue left in the gate of the mold has attracted considerable attention. Although this sprue can be recovered, it must go through an expensive reprocessing operation before reuse. Attempts have been made to overcome this difficulty by lengthening the nozzle of the injecting machine such that it extends into the mold substantially to the parting line, thus eliminating the sprue. This modification has met with only minor success because of the formation of cold slugs in the nozzle resulting from the chilling of the material. By extensive experimentation, I have found that substantially all of this chilling can be eliminated by making the mold opening for the nozzle large enough to eliminate contact between the nozzle and the mold, except in the immediate vicinity of the extreme end of the nozzle. This eliminates the metal to metal contact by which the heat is transferred from the nozzle. The difficulties relating specifically to the working of thermosetting plastic materials surround the necessity for temperature control to prevent polymerization before transfer to the mold. Heretofore such plastic materials were usually compressed into preforms or brickettes which were subjected to a rapid preheating treatment. The preheating raised the temperature of the plastic to a point below that at which polymerization would take place. The heated block of material was then placed under a ram which forced it into a heated mold where it was raised to the polymerization temperature. Such a procedure involved a number of time consuming steps as well as requiring a large capital outlay for the necessary equipment. Furthermore, it was not a continuous process, each block of material having to be separately preheated and then placed under the compression ram before insertion of the material into the mold. My invention eliminates the need for the blocks or brickettes, making it possible to operate directly from loose or granular thermosetting plastic material. Thus, there is no necessity for the preforming and the preheating machinery and the operation is continuous, being capable of supplying prepared plastic material to the mold as fast as the material can be cured in the molds and an empty mold positioned for receiving the next charge of material. My machine is so designed that no slug of cured material will form, since the material never reaches the curing temperature in the machine even though it is always sufficiently heated that it will work easily and quickly.

In addition to the elimination of the preforms, by redesign of the nozzle penetrating the mold, accidental curing of the plastic in the nozzle is eliminated. The same principle of eliminating contact between the mold and the nozzle, as employed in the case of thermoplastics, is utilized. However, when thermosetting plastic materials are used, the absence of contact prevents the curing of the material in the nozzle by heat transferred from the mold.

Not only does my invention eliminate the necessity for two different machines for handling thermoplastic and thermosetting plastic materials but it also eliminates the necessity for separate machines for injecting and extruding thermoplastics. A few minor adjustments are all that is required to change my machine from one adapted for injection to one adapted for extrusion.

Therefore, it is a primary object of my invention to provide a process for working plastics applicable with equal facility to both the thermoplastic materials and thermosetting plastic materials including rubber.

It is an additional object of my invention to provide a process for working plastics which is applicable not only to handling thermoplastic and thermosetting plastic materials, as aforesaid, but which may also be used in conjunction with both an injector and an extruder for thermoplastics.

It is a further object of my invention to provide a thermosetting plastics working machine for practicing my process in which a plasticizer chamber is provided, eliminating the need for both preform blocks and a preheating operation on these preform blocks.

A further object of the invention is to provide a plastic working machine utilizing my method and capable of doing injection-type molding in which the pressure required on the ram is greatly reduced from conventional practice.

It is a further additional object of my invention to provide a method for working thermoplastic in an injection machine whereby the ram is prevented from fouling or becoming locked by material entering into the clearance space between the ram and the cylinder wall.

It is a still further object of my invention to provide a plastics working machine for practicing my process in which an accurate control of temperature of the plastic material is maintained at all times and which is capable of preparing material, either of the thermoplastic or thermosetting variety, in sufficient quantities that the only limitation upon its production volume is in the speed with which the molds can be emptied and reset.

An additional object of my invention is to provide a method for working plastics which will not permit the formation of cold slugs.

Other objects and purposes of my invention will be apparent to those acquainted with the plastics or rubber working arts, particularly after reading the following description in connection with the accompanying drawings, in which:

Figure 1 is an elevational view of the operating portion of an improved plastics working machine for carrying out my process with the supporting framework and actuating equipment removed.

Figure 2 is a sectional elevational view showing the horizontal feeding mechanism of my improved plastics working machine excepting only the screw operating motor and the supporting frame structure.

Figure 3 is a sectional view of my improved plastics working machine taken along the plane III—III of Figure 1.

Figure 4 is a sectional view of my improved plastics working machine taken along the plane IV—IV of Figure 2 but omitting the screw.

Figure 5 is a sectional view taken along the plane V—V of Figure 2 but omitting the screw.

Figure 6 is a sectional view taken along the plane VI—VI of Figure 2 with the sealing ring removed and omitting the screw.

Figure 7 is a fragmentary sectional view of the screw of my improved plastics working machine taken along the plane VII—VII of Figure 2.

Figure 8 is a central, sectional elevation view of the vertical compression chamber of my improved plastics working machine taken from the same position as Figure 1 but omitting both the supporting structure and the actuating mechanism.

Figure 9 is an enlarged central, sectional elevation view of the nozzle of my improved plastics working machine.

Figure 10 is a fragmentary sectional elevation view of the auxiliary feed of my improved plastics working machine taken along the plane X—X of Figure 11.

Figure 11 is an elevation view of the supporting structure for the vertical compression chamber of my improved plastics working machine.

Figure 12 is a sectional elevation view of the supporting structure for the vertical compression chamber of my improved plastics working machine taken along the plane XII—XII of Figure 11.

Figure 13 is a sectional view of the supporting structure for the vertical compression chamber of my improved plastics working machine taken along the plane XIII—XIII of Figure 12.

Figure 14 is a sectional view of the supporting structure for the vertical compression chamber of my improved plastics working machine taken along the plane XIV—XIV of Figure 12.

Figure 17 is a bottom view of the removable bed for the horizontal feeding mechanism of my improved plastics working machine.

Figure 18 is a fragmentary sectional view of the removable bed and mounting frame for the horizontal feeding mechanism of my improved plastics working machine taken along the plane XVIII—XVIII of Figure 15.

Figure 19 shows the removable bed for the horizontal feeding mechanism mounted on the mounting frame after 90° rotation from the position shown in Figure 15.

Figure 20 is an enlarged, exaggerated, fragmentary view showing the operation of the ram of my improved plastics working machine upon thermoplastic material.

Figure 21 is an enlarged elevational fragmentary view of a modified nozzle for my improved plastics working machine adapted for working thermosetting plastic materials.

Figure 22 is a sectional view in central elevation, similar to Figure 10, showing a modified form of my machine.

Figure 23 is an enlarged, fragmentary sectional view of the ram and ram cylinder shown in Figure 22 and showing the ram in retracted position.

Figure 24 is a section taken on the line XXIV—XXIV of Figure 2.

Figure 25 is a detail of the lower end of the ram showing the action thereof with respect to the plasticized material.

Figure 26 is a schematic illustration of a preferred hydraulic circuit used in my machine.

BRIEF DESCRIPTION

Figure 15:
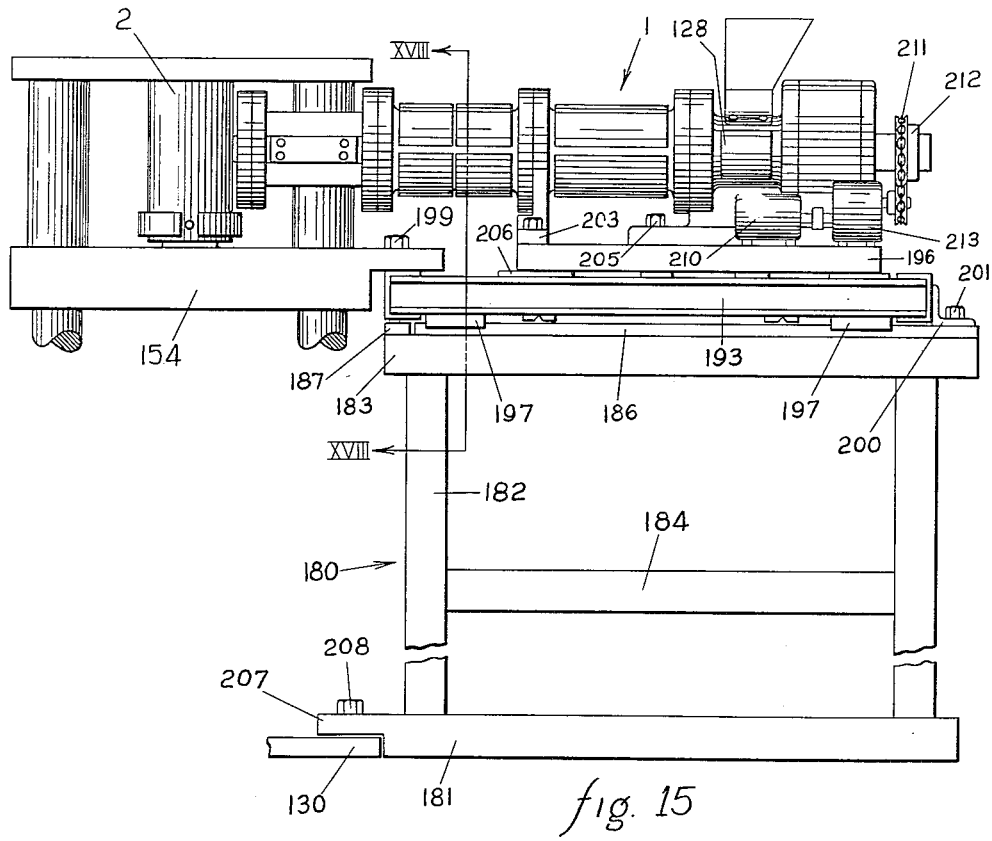
Figure 15 is a side elevational view of the supporting structure for the horizontal feeding mechanism for my improved plastics working machine with a fragmentary showing of the supporting structure for the vertical compression chamber.

In executing the objects and purposes of my invention I have provided an improved series of steps for handling plastic material and will, for purposes of illustration, hereinafter disclose said steps in connection with one specific machine by which they are advantageously practiced. In this connection, however, it should be clearly understood that the detailed description of said machine hereinafter following is for the purpose both of furthering the illustration of my process and also of disclosing in detail one specific means for practicing same and does not carry any implication that the practice of said process is in any way limited thereto. On the contrary, it will be quite evident that the process is capable of being practiced by other machines of a wide variety.

Briefly, my process comprises a series of steps controlling the temperature of the plastic material within certain desirable limits and applying to said plastic material first a high degree of agitation for the thorough mixing and working thereof and subsequently a pressure for curing it into a mold. In my process, the plastic material is first simultaneously heated and agitated as it moves through a confined path. The temperature of said plastic material, which is controlled, is raised to a point that the material is workable and will flow under a substantial pressure, but said temperature is held below that temperature at which the material becomes unsuitable for passing into a mold, namely scorched in the case of thermoplastic materials and either scorched or hardened in the case of thermo-setting materials. The material is heated in relatively thin sections so that the heating thereof is thorough and complete. The material is next accumulated at the end of the heating zone, held at the proper temperature and continuously and further agitated to prevent over heating of any part thereof. When a proper amount of material has accumulated, it is then rapidly propelled into a pressure chamber, subjected to further heating near the outlet thereof and simultaneously driven into a mold.

In the following description the terms "upwardly" and "downwardly" will be freely used and are to be taken as meaning upwardly in the direction of the top of the machine as shown in Figure 1 and downwardly away therefrom. The terms "inwardly" and "outwardly" are also freely used and are to be taken as inwardly toward the vertical axis of the vertical ram occupied chamber and outwardly away therefrom. This terminology will remain constant throughout the following description but its use is not intended to imply any limitation on the position in which said machine is placed and it should be understood that excepting where clearly indicated otherwise by the context the machine is capable of operating in any position and the particular position here illustrated and the terminology particularly applicable thereto, are chosen for illustrative purposes only.

DESCRIPTION

For the purposes of clarity the remainder of this specification has been divided into the following sections: Description, Assembly, and Operation. The section entitled "Description" has been subdivided into: *a*, Horizontal feeding mechanism; *b*, Screw; *c*, Vertical composition chamber; *d*, Nozzle; *e*, Auxiliary feed; *f*, Heating and cooling; *g*, Supporting structure; and *h*, Motive equipment. The part entitled "Assembly" is not subdivided. The section entitled "Operation" has been subdivided into: *a*, Thermoplastics; *b*, Thermosetting plastics; *c*, Extrusion; and *d*, Operation in general.

Further, for the purpose of clarity the numbering used on the drawings and in this specification has been divided into groups and any numbers appearing within the range given in each of the following groups refer to items relating to that particular portion of my invention.

Numbers 1–39, horizontal feeding mechanism
Numbers 40–49, screw
Numbers 50–69, vertical compression chamber
Numbers 70–79, Nozzle
Numbers 80–99, auxiliary feed
Numbers 100–129, heating and cooling
Numbers 130–179, support structure for vertical compression chamber
Numbers 180–209, support structure for horizontal feeding mechanism
Numbers 210–219, motive equipment
Numbers 220 and up, miscellaneous Referring now to the drawings in general detail, the numeral 1 refers to the horizontal feeding mechanism detachably associated with a vertical compression chamber 2 (Figure 1).

a. *Horizontal feeding mechanism*

The horizontal feeding mechanism 1 (Figure 2) includes a central chamber 3 enclosed by a housing 4 consisting of an inward member 5, central member 6, and outward member 7 detachably joined together by bolts 8. Each of the housing members 5, 6 and 7 are equipped with a liner 9. The liners 9 are so made that they firmly engage the side walls of the housing members. Their interior bores, which as a group define the central chamber 3, are machined to a close tolerance and are provided with a smoothly polished surface. One end of the liner 9 in the inward 5, central 6, and outward 7 housing members projects beyond its associated housing member such that when the housing members are assembled it enters the next inwardly positioned part of the housing 4 to effect a tight, pressure resistant seal.

To the outward end of the outward housing member 7 a collar 10 is rigidly mounted by bolts 11. The upper side of the collar 10 (Figures 2 and 3) is provided with an opening immediately above which is mounted the hopper 28 by means of the bolts 29. Spaced from the collar 10 by a cylindrical spacer 12 is a disc-shaped end plate 13 (Figure 2) equipped with a coaxial central opening 14. The spacer 12 is mounted to the collar 10 by bolts 15 and the end plate 13 is mounted to the spacer 12 by bolts 16. Within the area between the collar 10 and the end plate 13 is an arbor 17 mounted on a thrust bearing 18 and having a radially projecting flange 19 equipped with a peripheral groove 20. A blind bore 21, coaxial with the arbor 17 and equipped with a keyway 22, projects outwardly from the inward face of the arbor. The outward end 23 of the arbor 17 is of reduced diameter and passes through the central opening 14 in the end plate 12. An oil seal 24 is seated within the groove 20 and a further oil seal 25 surrounds the arbor 17 as it passes through the central opening 14. An annular sealing ring 26 is compressed between cooperating, semicircular grooves in the spacer 12 and the end plate 13. A bushing 27, for supporting the screw 40, is inserted in the outward end of the outward housing member 7.

The main body portion of the inward housing member 5 is (Figures 4 and 5) of octagonal shaped cross section and has circular flanges on each of its ends. The purpose of the octagonal cross section of the inward housing 5 will appear more fully hereafter. By means of the bolts 31 a circular head 32 (Figures 2 and 6) is mounted on the end of the inward housing member 5. The head consists of an annular flange 33 and a coaxial annular boss 34 threaded on its exterior surface. The head 32 has a concentric central passage 35 of the same diameter, at its outward end, as the central chamber 3 of the horizontal feeding mechanism 1 and of reduced diameter as it passes through the boss 34.

b. *Screw*

Positioned within the central chamber 3 (Figure 3) is a single lead screw 40 consisting of a main portion 41 and head portion 42. In the area adjacent the hopper 28 the main portion 41 of the screw 40 is provided with a short, second helical lead 43.

The head portion 42 of the screw 40 may be replaceable with head portions of equal size but each equipped with a thread of different pitch. One, illustrated in the drawings, has a constant pitch equal to the pitch of the thread on the main portion 41 at its inward end; another, not shown, has a constant pitch considerably greater than the pitch of the main portion 41 at its inward end; and a third, not shown, has a thread of decreasing pitch. The purpose of providing replaceable head portions for the screw equipped with leads of different pitches will be described more fully hereafter under the title "Operation". Each of the heads (Figure 7) is equipped with a concentric externally threaded annular flange 44 designed to engage the threaded opening 45 in the main portion 41 of the screw. Where the screw 40 passes through the outward end of the collar 10 a shoulder 46 (Figure 2) supports the screw where it engages the bushing 27. Outwardly of the shoulder 46 a stub shaft 47 integral with the screw 40 is received into the blind bore 21 of the arbor 17. A key 48, seated in a cooperating slot in the stub shaft 47 and engaging the keyway 22, holds the screw 40 in nonrotating relationship to the arbor 17.

The outside diameter of the screw 40, where equipped with the helical ridge, is such that it seats within the central chamber 3 with only sufficient clearance between it and the liners 9 that it may rotate without binding.

c. *Vertical compression chamber*

Vertically positioned at substantially a right angle to the horizontal feeding mechanism 1 is the vertical compression chamber 2 (Figure 8), hereinafter sometime referred to as a "ram cylinder," consisting of a cylindrical housing 50 equipped with a lining shell 51. A side opening 52 positioned substantially above the lower end of the vertical compression chamber 2 extends perpendicularly to the center line of the vertical compression chamber 2 and is internally threaded to receive the boss 34 of the head 32. Above the side opening 52 and positioned horizontally 90° from it is an auxiliary opening 53. The purpose of the auxiliary opening 53 will appear more fully hereafter. Near its upper end the cylindrical housing 50 is provided with an external step 54 of reduced diameter and a collar portion 55 equipped with external threads. The inside of the top of the vertical compression chamber 2 is cut to form a step for sealing the bushing 56. The bolts 57 secure the bushing 56 to the cylindrical housing 50.

The ram 58 enters the top of the cylindrical housing 50 through the bushing 56. The clearance between the ram 58 and the inside wall of the bushing 56 and lining shell 51 is only sufficient to permit the ram 58 to be moved without binding between the parts. The upper end of the ram 58 is of reduced diameter and is equipped with an external thread. The lower end of the ram cylinder is counterbored at 59 and internally threaded concentrically with the central axis of the cylindrical housing 50.

The ram, or at least the lower end thereof is hard-surfaced, preferably by nitriding, and, accordingly, will be made from any suitable nitralloy steel. The ram is axially bored and provided with suitable conduits and connections for conducting a cooling liquid, such as water, to a point adjacent the lower surface thereof in controllable amounts.

The ram is preferably relieved at 60, throughout the greater part of its length, in order to minimize the friction between it and the walls of the ram cylinder, but, as shown in the drawings, it will be understood that this relief preferably commences at a point spaced sufficiently from the lower end of the ram that even in the lowermost position of the ram the relief will not extend across the opening 53 from the preliminary processing chamber 3. This is so that an effective seal will be maintained against escape of material from the said chamber 3 during the full time the ram is in extended position.

Commencing at a point 61 slightly above the position of the lower end of the ram when said ram is in its uppermost, or retracted, position, the walls of the ram cylinder are also relieved slightly. Adjacent this zone of said ram cylinder, there is provided a series of cooling means 129 and 129a, Figure 22. Thus, sufficient cooling can be provided for the upper end of the ram cylinder to cause thermoplastic material adhering to the ram to flake off without danger of causing the ram to bind against the walls of the ram cylinder, and, further, the relief so provided in the said walls aids in causing and permitting said flaking and the consequent clearing of the ram to occur.

d. Nozzle

A preferred nozzle 70 (Figure 9) at the lower end of the vertical compression chamber 2 consists of a threaded boss 71, collar 72, shoulder 73, and tapered neck 74. A throat 75 consisting of a conical upper portion and a restricted lower tube occupies the center of the nozzle 70. The length of the tapered neck 74 is such that it is capable of penetrating a mold to the parting line. The aperture 76 in the mold is so designed that the nozzle only contacts the mold 77 at the lower end of the tapered neck 74.

It will be evident, of course, that the precise internal contours of the nozzle may be varied extensively in response to varying requirements of the plastic material being used or the molded product being made, and that under some circumstances it may even be desirable to use with thermoplastics the straight form of nozzle shown at 78 in Figure 21 and described in detail hereinafter in connection with its use with thermosetting materials.

e. Auxiliary feed

The auxiliary feed 80, where used (Figures 10, 11 and 12), includes a horizontal cylinder 81 and a plunger 82 mounted therein. The length of stroke of the plunger 82 permits it to enter the chamber within the cylindrical housing 50. An orifice 83 opens into the top of the cylinder 81. A hopper 84 having a discharge opening 85 offset from the orifice 83 is mounted above the cylinder 81. A slide 86 connected to the plunger 82 for movement therewith by means of the yoke 87 is equipped with a pocket 88 which, in one position of the plunger is aligned with the discharge opening 85, and in another position of the plunger is aligned with the orifice 83.

The yoke 87 (Figure 10) includes an outwardly extending rod 89 rigidly mounted to the slide 86, the rod having a stop 90 at its outward end and ring 91 spaced outwardly a short distance from the slide 86. A plate 92 attached to the outward end of the plunger 82 slidably embraces the rod 89 for alternate contact with the stop 90 and the ring 91. The auxiliary feed 80 is mounted to the cylindrical housing 50 by means of the support member 93 and bolts 94. The auxiliary feed 80 is further supported by the hereafter described frame.

f. Heating and cooling

The operating parts and housing of the horizontal feeding mechanism 1 and of the vertical compression chamber 2 are heated and cooled by a combination of water coolants and electrical heaters. The purpose of providing both heating and cooling and the cycles through which each of these particular operations function will be described hereafter.

The heating devices associated with the horizontal feeding mechanism 1 (Figures 1 and 2) include two pairs of semicircular electrically operated jackets 100, one pair embracing the outward member 7 of the housing 4 and the other pair embracing the central member 6 of the housing 4. A pair of electrically operated resistance heaters 101 (Figures 1 and 5) are mounted by means of the bolts 102 to the inward member 5 of the housing 4, one on each side.

Heat is provided in the vertical compression chamber by means of the semicircular electrical units 103 (Figures 8 and 10) surrounding the cylindrical housing 50 between the nozzle 70 and the side opening 52. The nozzle 70 (Figures 8, 9 and 10) is heated by electrical members 104 mounted on the shoulder 73.

In Figure 22 there is shown a modified form involving further heaters 103a by which the walls of the ram cylinder may be fully, and uniformly, heated throughout the travel of the ram during a normal cycle in handling thermoplastic material. In this manner the walls will be caused to expand evenly and thereby eliminate any tendency to bind the ram in one portion of its cycle, which now occurs when only the bottom of the cylinder is heated. Further, in the event that a quantity of thermoplastic material adheres to the ram and would otherwise tend to bind between the ram and the adjacent walls of the ram cylinder, the heated wall will soften such material and prevent its so binding. Thus, the ram may operate for an indefinite period of time without the necessity of stopping the machine to clean the ram.

There is preferably also present a further heating means 128 (Figure 1) to heat the cylinder jacket 10 in the region of the hopper. Especially in the handling of acetates and acrylics having fines therein, heating this section will prevent binding of the particles between the screw and the walls of the chamber and thus eliminate the high power requirements, breakage of screws and excessive noise sometimes occurring when such heating is lacking. This heating means is, of course, optional and will be found unnecessary with certain other materials. In any case, the heating should not be permitted to pass far enough up into the hopper walls to cause the plastic material contacting same to become sticky and the particles thereof to adhere to each other.

Cooling is effected by passing a coolant through a number of passageways in the housing structure of my improved plastics working machine.

To limit the passage of heat from the jackets 100 to the hopper 28 the outward housing member 7 (Figure 2) adjacent the collar 10, is equipped with a pair of horizontally disposed tubular canals 105. To further protect the hopper 28 against heat, a coil 106 (Figure 3) surrounds the lower portion of the hopper 28 for circulating a coolant.

The inward housing member 5 (Figures 2, 4 and 5) is equipped with an inlet tube 107, an outlet tube 108 and a plurality of intermediate tubes 109 each connected to a different adjacent tube on each of its ends by a slot 110 so as to form a continuous passage between the inlet tube 107 and the outlet tube 108. An annular channel 111 at each of the tube ends is sealed by the ring 112 (Figure 2) welded to the inward housing member 5. A thermocouple 113 penetrates the inward housing member 5 approximately midway between its ends.

Cooling is provided in the head 32 (Figure 6) by means of a circular groove 114 cut in the outward face of the annular flange 33. The circular groove 114 has an outward portion of rectangular cross section and an inward portion of U-shaped cross section. The U-shaped portion of the groove 114 does not trace an entire circle, each of its ends being connected to a tube 115. A ring 116 (Figure 2) seats within the rectangular portion of the groove 114 and when welded into position seals the outward end of the U-shaped portion of the groove 114 to form a fluid passageway.

To cool the screw 40 a central passageway 117 (Figure 7) in the head portion 42 enters into a similar opening 118 extending the entire length of the main portion 41 of the screw 40. A tube 119, open at its inward end, is positioned within the opening 118 and terminates a short distance from the inward end of the central passageway 117. A suitable connection 120 (Figures 1 and 2) supplies coolant to the tube 119 and a further connection 121 discharges coolant from the opening 118. Rings 128 (Figure 7) each having openings to permit the passage of coolant support the tube 119 within the central passageway 117 and the opening 118. Similarly to the screw 40, the ram 58 (Figures 8 and 12) is cooled by means of a central canal 122, having a tube 123 within it extending substantially the full length of the ram 58. The tube 123 is connected to an inlet tube 124 (Figure 8) and the canal 122 is connected to an outlet tube 125.

An opening 126 (Figure 10) is provided in the cylindrical housing 50 above the side opening 52 and below the auxiliary opening 53 to inhibit the passage of heat from the lower portion of the cylindrical housing 50 to the auxiliary feed 80. A thermocouple 127 (Figure 8) is mounted in the wall of the cylindrical housing 50.

Water is forced through each of the passageways in the horizontal feeding mechanism 1, the vertical compression chamber 2, the screw 40, the ram 58 and the coil 106 surrounding the hopper 28. Although water is described as the cooling medium used, it is to be understood that this is for example only, and other suitable liquid coolants may be substituted without departing from the purpose of my invention.

The source of the liquid coolant may be a closed system operated by means of a pump or it may be connected to a source of water under pressure whereby it is forced through the cooling passageways once and discharged. Neither the source of the collant nor the connecting pipes are shown since they may be any one of several suitable systems all of which are conventional both in design and operation and form no part of my invention.

g. Supporting structure

The supporting framework for the plastics working machine includes two primary structures; that supporting the vertical compression chamber 2 and that supporting the horizontal feeding mechanism 1.

aa. For vertical compression chamber and auxiliary feed

The supporting framework for the vertical compression chamber 2 is mounted on a base plate 130 (Figures 11 and 12) to which is attached, by welding, four hollow columns 131 (Figure 13) connected by shear panels 132. Cutouts 133 are provided in two of the shear panels 132 to permit access to the hereafter described actuating cylinder positioned between the columns 131. The columns 131, at their upper ends, are welded to and support the tie beam 134 which forms a square substantially the size of the area enclosed by the columns 131 and open at its center. Access holes 135 (Figures 11, 12 and 13) are provided in each of the columns immediately below the tie beam 134. Buttress supports 136 welded to the base plate 130 and to the shear panels 132 engage the tie beam 134 on two sides of the square. A header plate 137 (Figure 12) is bolted to the tie beam 134, which header plate has a central opening of sufficient diameter to permit passage of the piston of the hereafter described actuating cylinder 216 situated between the columns 131.

Extending upwardly from the tie beam 134 are the cylindrical, vertical shafts 138 each one situated concentric with one of the hollow columns 131. The lower end of each of the vertical shafts 138 has a portion 139 of reduced diameter creating a shoulder 140. Each of the portions 139 of reduced diameter passes through a hole of suitable diameter in the tie beam 134 and projects into one of the access holes 135 in the columns 131. The ends projecting into the access holes 135 are threaded to receive the nuts 141. When the nuts 141 are tightened the shoulder 139 engages the upper surface of the tie beam 134.

A mold bed 142, slidably mounted for reciprocating vertical movement on the vertical shafts 138, has a centrally located mounting block 143 attached to its lower surface. The openings in the mold bed 142 for receiving the vertical shafts 138 are each equipped with a bushing 144.

Substantially below their upper ends the vertical shafts 138 are provided with an upwardly facing ridge 140a (Figure 12) upon which rests the auxiliary platform 145 which has a centrally situated circular opening 146 for receiving the upper end of the cylindrical housing 50. The orifice 83 (Figure 10) of the auxiliary feed 80 also extends through the auxiliary platform 145. Upwardly projecting side members 147 (Figures 11 and 12) are welded to the phriphery of the auxiliary platform 145. One of the side members is provided with a cutout 148 (Figure 10). Supported by the side members 147 is a removable cap plate 149 having an access opening 150 (Figure 14) and a centrally located aperture 158. A post member 151, concentric with the circular opening 146, extends between the auxiliary platform 145 and the cap plate 149 and is rigidly attached to the former. The upper ends of the vertical shafts 138 are threaded for receiving the header nuts 152.

By means of the spacers 153 (Figure 12), the deck plate 154 is positioned below the auxiliary platform 145 and is retained by the bolts 155. A removable insert 156 (Figure 9) is mounted in the center of the deck plate 154 by means of the bolts 157.

Above the cap plate 149 and centered about the aperture 158 is the ram mounted pillar 159 which includes the side elements 160, two of which are provided with vertical slots 161, and a top plate 162 having a central hole 163. By means of bolts 164 a cylinder base member 165 is mounted to the upper surface of the topplate 162. The rods 166, equipped with a head at their upper end and threads at their lower end, in cooperation with the thrust block 167, mount an actuating cylinder above the cylinder base member 165. Threaded holes are provided in the cylinder base member 165 to receive and engage the threaded ends of the rods 166.

The auxiliary feed 80 (Figures 10, 11, and 12) is mounted to the auxiliary platform 145 by means of bolts 172 (Figure 11) with the horizontal cylinder 81 and plunger 82 below the auxiliary platform and the slide 86 and hopper 84 above it. A hollow housing 168, open on one end to receive the slide 86, is bolted to the upper surface of the auxiliary platform 145 and supports the hopper 84 above it and beneath the access opening 150 in the cap plate 149. Between the horizontal cylinder 81 and the auxiliary platform 145, a spacer sheet 169 extends from the cylindrical housing 50 outwardly beyond the side members 147 for mounting the actuating cylinder 215 for the auxiliary feed 80. Brackets 170 brace the outward end of the spacer sheet 169. A channel 171 in both the auxiliary platform 145 and the spacer sheet 169 permits free travel of the plate 92 of the yoke 87.

bb. For horizontal feeding mechanism

The horizontal feeding mechanism 1 is slidably and rotatably supported by a mounting frame 180 (Figure 15) which includes the base runners 181 to which are attached the leg elements 182 and top frame 183. The mounting frame 180 is braced by the cross members 184. The top frame 183 is equipped with rails 186 (Figures 15, 16, 18 and 19) of triangular cross section spaced apart a major portion of the width of the top frame 183. A stop member 187, having a threaded opening in each end, is attached across one end of the upper surface of the top frame 183. A beam 188 (Figure 16) centered between the sides of the top frame 183 extends the length of the top frame and is attached to the end members 189 and lateral member 190 of the top frame 183. Mounted on this beam 188 are the pair of spacer blocks 191 and the spacer block 192. Each of the spacer blocks 191 and 192 are equipped with an internally threaded opening.

The movable bed 193 (Figures 15, 17 and 18) includes the side elements 194 and end elements 195, each rigidly attached to the other to form a firm and strong unit. The movable bed 193, in one position (Figures 15 and 18), is supported on the rails 186 by means of the guide blocks 197, each of which guide blocks is provided with a V-shaped channel to receive one of the rails 186. A plurality of indexing members 198 (Figures 15, 17 and 19), similar in shape to the guide blocks 197, but smaller, are mounted to the lower surface of the movable bed 193, spaced apart, longitudinally of the movable bed, the same distance as that existing between the rails 186 and with their channels set perpendicular to the channels of the guide blocks 197. The indexing members 198 are sufficiently smaller than the guide blocks 197 that when the movable bed 193 is supported by the guide blocks 197 (Figure 19) there is no contact between the indexing members 198 and the rails 186.

When the movable bed 193 is mounted on the guide blocks 197 and is moved into operating position it is held against movement relative to the mounting frame 180 by means of the bolts 199 (Figure 15) which pass through the deck plate 154, the movable bed 193 and engage the threaded openings in the ends of the stop member 187. The movable bed is further held by means of the angle 200 attached to its outward end and the bolt 201 which engages the threaded opening in the spacer block 192. When the movable bed is supported by the indexing members 198, it is locked into position by the bolts 202 which engage the threaded openings in the spacer blocks 191.

The horizontal feeding mechanism 1 is supported by the base post 203 and the footing 204 (Figures 2 and 15). The base post 203 and the footing 204 rest on the spacer plate 196 and are attached to the movable bed 193 by means of the bolts 205 which engage the threaded openings in the traverse beams 206 of the movable bed 193.

The framework supporting the vertical compression chamber 2 and that supporting the horizontal feeding mechanism 1 are joined at their lower ends by means of a pair of tie lugs 207 (Figure 15) welded to the mounting frame 180 and removably attached to the base plate 130 by the bolts 208.

h. Motive equipment

The greater part of the movable portions of my plastics working machine are operated by hydraulic equipment.

The screw 40 is operated by means of a hydraulic motor 210 (Figure 15) through a chain 211 and a sprocket 212 mounted on the arbor 17. The operation of the motor 210 is controlled by a time switch and torsional clutch 213, the latter of which will stop the motor if the torque load exceeds a predetermined amount. Both the torsional clutch 213 and the motor 210 are mounted on the movable bed 193. The time switch is not shown inasmuch as it is of conventional design and may be purchased from any one of several suitable maunfacturers. The hydraulic motor 210 may be replaced by an electric motor should such be considered desirable.

The ram 58 is operated by means of the actuating cylinder 214 (Figure 11) mounted on the cylinder base member 165 and held in place by the rods 166 and thrust block 167. The piston of the air cylinder 214 is rigidly attached to the top of the ram 58 by any suitable means such as threads.

The plunger 82 of the auxiliary feed 80 (Figure 10) is operated by means of the actuating cylinder 215 which is mounted to the lower surface of the spacer sheet 169. The piston of the cylinder 215 and the plunger 82 are suitably connected for simultaneous movement.

The mold bed 142 is operated by an actuating cylinder 216 (Figures 12 and 13) mounted on the base plate 130 between the hollow columns 131 by means of the anchor boss 217. The piston of the actuating cylinder 216 is suitably fastened to the mounting block 143 on the lower side of the mold bed 142.

Suitable timing, actuating and control means, either hydraulic, pneumatic, or electric, are provided of any conventional form effective for carrying out the various functions herein described.

Each of the actuating cylinders 214, 215 and 216 may be operated pneumatically or hydraulically, whichever is most satisfactory under the circumstances of use of my machine. However, I have found it preferable to operate the actuating cylinders hydraulically because of the greater degree of control afforded by this method. Each of the actuating cylinders must be equipped for reciprocating operation in order that the attached devices may be returned to their original positions after each movement. Neither the particular construction of the actuating cylinders, the source of operating fluid nor the structure connecting the cylinders to the source of operating fluid are shown inasmuch as each of these are matters of conventional design and do not in any way affect the basis of my invention.

Similarly, the various switches, relays, timers and valves controlling the sequence and length of time through which each of the actuating cylinders 214, 215 and 216 and the motor 210 operate are neither shown nor described in detail since they are conventional equipment. These parts are referred to in "Operation" only to the extent necessary to make the description of the operation of my invention clear and complete.

ASSEMBLY

The supporting framework for the vertical compression chamber 2 is assembled starting with the base plate 130, welding and bolting the various parts together until the assembly is perpared to receive the upper portion of the structure including the vertical compression chamber 2 and the auxiliary feed 80. Before installation of this upper portion of the supporting structure, the auxiliary platform 145 is passed over the upper end of the cylindrical housing 50 with the latter being received through the circular opening 146 until the lower surface of the auxiliary platform 145 rests against the external step 54 of the cylindrical housing 50. The parts are then locked together by tightening the internally threaded ring nut 220 on the collar portion 55 until it firmly engages the washer 221. The auxiliary feed 80 is then attached to the auxiliary platform 145 by means of the bolts 172 and to the cylindrical housing 50 by means of the bolts 94. The deck plate 154 and spacers 153 are assembled to the auxiliary platform 145 by means of the bolts 155. The resulting assembly is passed down the vertical shafts 138 until the auxiliary platform 145 engages ridges 140a on the vertical shafts 138. The side members 147, post member 151 and cap plate 149 are then put in place, all but the latter being welded to the auxiliary platform. Installation of the header nuts 152 secures these parts in place. The ram mounting pillar 159 is welded to the cap plate 149 and the actuating cylinder 214 securely attached by means of the rods 166. This completes the assembly of the supporting framework for the vertical compression chamber 2.

The mounting frame 180 for the horizontal feeding mechanism 1 is assembled by welding together the base runners 181, leg elements 182, cross members 184, and top frame 183. The beam 188 with the spacer blocks 191 and 192 is welded to the top frame 183 before the latter is assembled to the remainder of the mounting frame 180.

The various parts making up the movable bed 193 are welded together and the horizontal feeding mechanism attached to the completed assembly by means of the bolts 205.

The horizontal feeding mechanism is assembled by bolting the cylindrical spacer 12, collar 10, outward housing member 7 and central housing member 6 together. The screw 40, arbor 17 and thrust bearing 18 are next installed. Placement of the end plate 13 and tightening of the bolts 16 secure the screw 40 and its associated parts in place. The sprocket 212 may then be installed on the end of the arbor 17. The hopper 28 with the coil 106 in place is mounted on the housing 4 by means of the bolts 29.

The heating jackets 100 are mounted on the central housing member 6, outward housing member 7 and the resistance heaters 101 are bolted to the inward housing member 5 by bolts 102. The head 32 is threaded into the side opening 52 in the cylindrical housing 50. The horizontal feeding mechanism 1 and the vertical compression chamber 2 are then assembled by installation of the bolts 31 joining the head 32 to the inward housing member 5.

The framework supporting the vertical compression chamber 2 and the mounting frame 180 for the horizontal feeding mechanism 1 are assembled by installation of the bolts 199 and 208.

The various electrical and coolant connections are made and the actuating cylinders 214, 215 and 216 and the motor 210 are operatively connected to suitable sources of fluid power. This completes the assembly of my improved plastics working machine.

OPERATION

After my machine has been used for one type of material such as a thermoplastic, it is necessary to modify it before using a thermosetting plastic material or using it as an extruder. Therefore, operation in each capacity will be described separately.

a. Thermoplastic materials

When my machine is used to inject thermoplastic materials into a mold, the horizontal feeding mechanism 1 and the vertical compression chamber 2 are both used. With certain materials, such as some polystrene formulations and acrylics, the auxiliary feed 80 will also be used. The cycle of operation starts with the ram 58 in up or withdrawn position and includes in operating order: (1) simultaneous rotation of the screw 40 and application of heat by the jackets 100 and resistance heaters 101; (2) stopping of the screw 40 and of the application of heat by the jackets 100 and resistance heaters 101 and simultaneous initiation of cooling by a coolant passing through the tubes 107, 108 and 109 and circular groove 114; (3) application of heat by the electric units 103; (4) application of heat by the electric members 104; (5) operation of the auxiliary feed 80; (6) descent of the ram 58; and (7) withdrawal of the ram 58.

The dry, cold, granulated material is fed into the hopper 28 from which it is discharged by gravity into the central chamber 3. After entering the central chamber 3 it is moved toward the vertical compression chamber 2 by the screw 40, the secondary lead 43 of the screw assuring rapid and continuous removal of the material from directly below the hopper 28.

As the material is moved inwardly by the screw 40 it is heated by means of the jackets 100 on the outward housing member 7 and central housing member 6. The jackets 100 do not supply heat continuously, but by means of timing controls, are alternately activated and inactivated. As the material enters the inward housing member 5 it is subjected to alternate heating and cooling. The heat is supplied by intermittent, timed operation of the resistance heaters 101 followed by intermittent, timed passage of water or other coolant through the inlet tube 107, outlet tube 108 and intermediate tubes 109. Further cooling is effected by passage of a coolant through the circular groove 114 of the head 32. The jackets 100 increase the temperature of the material to a point substantially below the temperature at which the material will decompose. While in the inward housing member 5, the material is heated to a temperature close to that at which it will decompose, generally 10° to 20° below this critical temperature, although it may vary such that it is somewhat below this range. The frequency and duration of the periods of heating and cooling are such that the material is raised to a point within this temperature range and ejected from the horizontal feeding mechanism 1 into the vertical compression chamber 2 at substantially this same temperature.

The periods of heating and cooling are coordinated to the intermittent operation of the screw 40. When the screw 40 is rotating so that the material is in motion and being mixed, the heating units are activated. When the screw 40 is not in motion, the cooling units are activated to prevent excessive heating and scorching of the material adjacent the wall of the central chamber 3. In addition to the heat applied by means of the jackets 100 and the resistance heaters 101, a certain amount of heat is obtained from the mechanical working of the material by the screw 40. The quantity of heat applied by the jackets 100 and the resistance heaters 101 is so controlled that this heat added to that generated by the screw 40 will not raise the temperature of the material to a point where it will be injured. Additional cooling is effected by means of the tube 119 supplying coolant to the central passageway 117 and the opening 118 in the head 42 and main portion 41 of the screw 40.

As the material is moved inwardly by the screw 40 it is mixed and compressed by the decreasing pitch of the main portion 41 of the screw 40.

When the material being worked is a thermoplastic and the machine is being used for injection molding, the head portion 42 of the screw 40 utilized is the one having a constant pitch equal to the smallest pitch of the main portion 41 of the screw. This permits the material to be thoroughly turned and mixed as it is moved by the head portion 42 of the screw 40, insuring contact by all of the material with the heated walls of the central chamber 3. It also prevents the generation of any substantial amount of frictional heat while in the inward housing member 5 where the temperature of the material approaches the critical upper limit.

While the ram 58 of the vertical compression chamber 2 is raised to the upper limit of its travel, the screw 40 operates to eject heated and worked material from the central chamber 3 into the vertical compression chamber 2 until a charge of predetermined quantity has been placed therein. The screw then ceases to rotate and the actuating cylinder 215 forces the plunger 82 of the auxiliary feed 80 the full length of its stroke, forcing into the vertical compression chamber 2 the dry plastic material previously deposited in the horizontal cylinder 81. At the limit of its inward stroke the plunger 82 enters the vertical compression chamber 2 in order to eject all of the material in the horizontal cylinder 81. As it does this it compresses the air within the vertical compression chamber 2, some of which escapes past the ram 58 and the plunger 82. The plunger 82 is then rapidly withdrawn causing a temporary reduction in pressure in the vertical compression chamber 2. The inward and outward movements of the plunger 82 are arranged to be very rapid. The purpose of the rapid movement and the resultant wide changes in air pressure within the vertical compression chamber 2 is to create turbulence in the air within the vertical compression chamber 2. This turbulence scatters the dry pulverulent plastic material ejected by the plunger 82 so that as it settles it forms an even film of dry material on the top surface of the hot, highly fluid material ejected into the vertical compression chamber 2 by the screw 40. This layer of dry material is exceedingly thin, averaging about .005 of an inch. However, this thin layer is sufficient to prevent jamming of the ram 58, as will appear more fully hereafter.

The material used for creating this thin layer between the fluid plastic material and the bottom surface of the ram 58 is a finely divided pulverulent form of the same plastic being fed into the vertical compression chamber 2 by the screw 40. This pulverulent material is cheap, a certain amount of it being created in the manufacture of plastics, and there are few uses for it since the standard plastics working machine is unable to handle pulverized material. When the material supplied by the screw 40 is changed, the material being fed by the auxiliary feed 80 must also be changed. The material used by the auxiliary feed 80 is placed in the hopper 84 through the access opening 150 in the cap plate 149. As the actuating cylinder 215 nears the inward end of its stroke it, by means of the plate 92, contacts the ring 91 on the rod 89 forcing the rod 89 and attached slide 86 inwardly. At the inward limit of the stroke the pocket 88 in slide 86 is aligned below the discharge opening 85 of the hopper 84 where it receives a charge of material measured by the size of the pocket 88. The pocket 88 remains aligned with the discharge opening 85 until the plate 92 contacts the stop 90 on the end of the rod 89 as the piston of the actuating cylinder 215 returns to its outward position. The slide is then moved outwardly until the pocket 88 aligns with the orifice 83 whereupon the material in the pocket 88 drops into the horizontal cylinder 81 in preparation for the next operating cycle of the auxiliary feed 80. The solid portion of the slide 86 acts as a gate to prevent escape of material from the hopper 84 when the pocket 88 is not aligned with the discharge opening 85.

After the auxiliary feed 80 has deposited the dry plastic material in the vertical compression chamber 2, the ram 58 starts its descent. The movement of the ram 58 is so rapid that when it strikes the layer of dry material the resulting impact will cause any improperly distributed material to scatter, further insuring an even coating on the upper surface of the hot fluid material and also partly plasticizing the dry material.

As the ram 58 continues its descent the pressure applied by it to the material will force the dry material at the periphery of the ram 58 (Figure 20) into the gap 230 between the ram 58 and lining shell 51 where it will immediately harden, due to the chilling effect of the ram 58, to form a collar 231 or seal against the entrance of the more fluid material immediately below the layer of dry material. The collar 231 formed by the dry material is, comparatively, very small, usually not exceeding a few hundredths of an inch in height. Once it has thus formed and hardened it will be forced to slide along the inner wall of the lining shell 51 and by the time the ram 58 has completed its descent and returned to its withdrawn position the collar 231 slides easily between the ram 58 and the lining shell 51. During each of the following operating cycles of the ram 58 a new collar 231, similar to the first one, will be formed, forcing each of the previously formed collars up the gap 230 between the ram 58 and the lining shell 51 until they emerge from the vertical compression chamber 2 after passing through the bushing 56. Since each of the collars, by the end of each of the operating cycles, slides easily along the lining shell 51, this accumulation of collars 231 will not cause the ram 58 to jam nor will they require material addition to the pressure necessary to actuate the ram.

Without the addition of the dry material to form the collar 231, the hot, fluid, plastic material will in many cases work up the gap 230 a material distance where it sets while the ram is at the lower limit of its downward stroke and thus may cause the ram to lock. This latter result has heretofore been the experience of those attempting to preheat the plastic material to a high temperature. The amount of dry, pulverulent, plastic material added is so minute compared to the total quantity being processed by the machine that the portion of it which is not absorbed by the formation of the collar 230, as it passes through the vertical compression chamber 2, is easily heated to the same temperature as the remainder of the material and is injected into the molds without any deleterious effect upon the final product. Thus, the dry, pulverulent material which is not absorbed by formation of the collar 230 exists as a layer on the top of the charge of plasticized material. Since the ram 58 moves only to the lower end of lining shell 51, a portion of this charge remains in the ram chamber at the end of one cycle of the machine. When the ram is retracted and another charge of plasticized material is deposited into the ram chamber in a subsequent cycle of the machine, the layer of dry pulverulent material will then be between two charges of substantially plasticized thermoplastic material and will absorb enough heat from each thereof to become itself similarly plasticized sufficiently to amalgamate with each of said adjacent charges and substantially to disappear as a separately identifiable entity either prior to, or concurrently with, its ejection from the ram chamber.

After the plastic material is ejected by the screw 40 into the vertical compression chamber 2, it is subjected to sufficient heating, by means of the electric units 103, to maintain its temperature in the same narrow range, just below that at which it will decompose, as it obtained while in the inward housing member 5. A final application of heat is given the material, by means of the electrical members 104, as it passes through the upper part of the throat 75 of the nozzle 70. The remainder of the heat necessary to maintain the material in a fluid state is created by the pressure of the ram 58.

With thermoplastic materials the nozzle 70 is used. The use of the long tapered neck 74 permits penetration of the mold to its parting line 232 and eliminates most of the gate in the mold, saving the material that would otherwise be required to fill the gate and thereafter would have to be removed and reprocessed to salvage it from scrap.

After the material is forced past the electrical members 104 no further heat is applied to it. Since the molds used in the forming of thermoplastic materials are not preheated, to prevent rapid chilling and the consequent formation of cold slugs, the aperture 76 in the mold 77 (Figure 9) is so constructed that the tapered neck 74 of the nozzle 70 will not contact it, except at the extreme lower end of the tapered neck 74. This latter contact is only of sufficient length to form a seal against the escape of material between the nozzle 70 and the mold 77. After the mold 77 has been filled, it may be removed and quickly replaced or opened and emptied, as convenient, in any conventional manner. In the meantime, the ram 58 has returned to its withdrawn position (Figure 8). The screw 40 then operates to place another charge of material in the vertical compression chamber 2 and the auxiliary feed 80 places a layer of dry material on the top of the new charge in readiness for the next descent of the ram 58.

When the thermoplastic materials are used, the lower limit of the stroke of the ram 58 is to the bottom of the lining shell 51. The tube 126, through which a coolant is continuously circulated, prevents the heat, existent in the lower part of the vertical compression chamber 2, from passing upwardly to the auxiliary feed 80 where it would heat the dry material in the horizontal cylinder 81. The hopper 28 is also continuously cooled by means of a coolant circulated through the opening 105 in the outward housing member 7 and the coil 106 surrounding the hopper 28 itself.

Alternatively, however, with such materials, as the polystyrene and arcylics above mentioned as requiring the use of the auxiliary feed 80, it is possible to effect the same satisfactory operation without the use of the dry material as above described, by the use of the heater along the full length of the ram cylinder. In this way, the thermal expansion of the cylinder walls will be uniform throughout most of the length thereof which is both itself unrelieved and traveled by the unrelieved part of the ram. When the ram is in its downward position, the film of plastic material which squeezes between the ram and the adjacent cylinder walls adheres to the ram when the ram travels back upwardly. Since the clearances are small in any event, this additional film on the lower end of the ram jams in the upper, unexpanded, part of the cylinder between the ram and the walls of the cylinder. However, by cutting off or eliminating the coolant passageway 126 and utilizing the full-length heaters 103a (Figure 23) to keep the entire ram cylinder below the auxiliary platform 145 at a substantially constant temperature, this difficulty is overcome. This temperature may vary somewhat, such as from 20 to 80 degrees Fahrenheit, from one end of the ram cylinder to the other but will throughout be slightly, as 30 to 50 degrees Fahrenheit, above the softening point of the thermoplastic material being handled. Thus, any film of plastic material which forms on the lower end of the ram will move easily throughout the entire cylinder and will not jam. The reliefs 60 and 61 of the ram and the cylinder walls adjacent the cooling means 129a permits such plastic as works up the ram to its upper end to be cooled and flaked off without such cooling effecting the binding of the ram and cylinder walls which it is the purpose of the heaters 103a to prevent.

However, it should be understood that in other instances such as with acetates, butyrates and vinyl materials, this use of dry material or uniform cylinder heating may be found unnecessary and, accordingly, it may be omitted without affecting the remainder of the invention.

As a further variation to meet certain operating conditions involving a long dwell of the ram in the downward position, the cooling liquid passing through the ram itself may be reduced in quantity, or actually replaced by a heated liquid. Where the dwell in the downward, or extended, position of the ram is short, the operation as above described proceeds in a wholly satisfactory manner. However, where the dwell is long, as two or three minutes, the ram in spite of the cooling liquid running through it, will absorb heat and expand. Since a film of plastic material will always squeeze between the ram and the cylinder walls when the ram first descends, this expansion of the ram will pinch this film very tightly. When the ram is then to be retracted it is necessary either to break the ram loose from this pinched flashing or to break the flashing loose from the body of plastic material below it. In either case, while the power requirement is not great, there results a highly objectionable noise which operators may misinterpret as evidence of damage to the machine. This entire difficulty is avoided by keeping the ram of substantially constant size through the cycle, that is, maintaining it at about the same temperature in all positions of operation, which is done by replacing the cooling water therewithin with water of whatever temperature is needed to keep it throughout its cycle at the same temperature it acquires when in downward position in contact with the hot plastic mass. Thus, while plastic still squeezes up as a flashing between the ram and the cylinder walls (at 231a in Figure 25) the ram will not expand to pinch said flashing and hence there is no difficulty in its retracting.

b. *Thermosetting plastic materials*

When the machine is used for thermosetting plastics both the horizontal feeding mechanism 1 and the vertical compression chamber 2 are utilized but the auxiliary feed 80 is not. The machine is modified by substitution of the straight nozzle 78 (Figure 21) for the nozzle 70 having the restricted throat 75. In addition, a different head portion 42 having a long constant pitch may, if desired, be substituted on the screw 40 for the head having the short constant pitch used for thermoplastic materials. The pitch of the head portion 42, used for thermosetting plastics materials, is materially greater than the pitch of the inward end of the main portion 41 of the screw 40.

The thermosetting plastics material is treated to stay within the A-stage while passing through the central housing member 6. It is then raised to the B-stage in the inward housing member 5 and is maintained in the B-stage in the vertical compression chamber 2. It is finally treated to reach the C-stage in the mold 77a.

The cycle of operation for thermosetting plastics starts with the ram 58 in raised retracted position and includes in operating order: (1) continuous rotation of the screw 40; (2) intermittent application of a small amount of heat by the jacket 100 on the central housing member 6; (3) alternate application of heat and cooling to the material in the inward housing member 5; (4) ejection of material by the head portion 42 of the screw 40 into the vertical compression chamber 2; (5) descent of the ram to the lower end of the straight nozzle 78; (6) temporary hesitation of the ram and polymerization of the material in the mold 77a; (7) continuation of the downward movement of the ram 58 through and beyond the straight nozzle; and (8) withdrawal of the ram to its retracted position.

The material is fed to the screw 40 by means of the hopper 28 and is worked and compressed by the screw as it is moved inwardly by the helical ridge of the screw 40. No heat is applied while it is passing through the outward housing member 7. A small amount of heat is applied while it passes through the central housing member 6 by short intermittent operation of the jackets 100 surrounding this housing member. While the material is in the inward housing member 5, it is subjected to alternate periods of heating by means of the resistance heaters 101 and of cooling by means of a coolant passing through the tubes 109, 107 and 108 and the circular groove 114 in the head 32. The excess of heat over cooling is sufficient to raise the temperature of the material to within 5% of the temperature at which polymerization of the material will commence. At this temperature the material is ejected by the screw 40 into the vertical compression chamber 2.

When thermosetting plastics are used, the screw 40 is in constant operation. While the ram 58 is down or in the act of transferring the material in the vertical compression chamber 2 to the mold 77a, the main portion 41 of the screw is forcing a new charge of material into the area of the central chamber 3 occupied by the head portion 42 of the screw 40. Since the pitch of the head portion 42, in the illustrative embodiment here discussed, is greater than that of the inward end of the main portion 41 of the screw 40, that portion of the central chamber 3 occupied by the head portion 42 acts as a storage chamber between discharges into the vertical compression chamber 2. While the material is being stored in the area of the head portion 42 of the screw 40 it is being heated. The constant rotation of the screw 40 keeps the material moving so that no portion of it remains in contact with the liner 9 a sufficient length of time to reach its critical temperature and polymerize. As the ram 58 withdraws to its retracted position, it uncovers the side opening 52 and immediately the screw 40 proceeds to eject the material compressed into the inward end of the central chamber 3. The wide pitch of the head portion 42 causes the material to be discharged quickly. When a predetermined sufficient length of time has elapsed to discharge the material stored in the inward end of the central chamber 3, the descent of the ram 58 closes the side opening 52, terminating the discharge.

The ram passes downwardly the entire length of the cylindrical housing 50 and continues through the straight chamber 79 of the straight nozzle 78. When it reaches the lower end of the straight nozzle 78, its stops long enough to permit the material which has been transferred to the mold 77a to be heated to the critical temperature and polymerized. It then continues its downward travel a short distance more to insure removal of the material which might otherwise remain in the straight nozzle 78. The ram 58 then returns to its retracted position and a new charge of material is put in the vertical compression chamber 2. During the last part of the ram's stroke in which it passes beyond the lower end of the straight nozzle 78, the mold 77a is lowered a distance equal to the travel of the ram by means of the actuating cylinder 216.

No heat is applied to the material while it is in the vertical compression chamber 2 except that generated by the compressive action of the ram 58. However, the mold 77a is heated and the material enters the mold 77a at a temperature slightly below that at which it will polymerize. The heated mold raises the material's temperature sufficiently to initiate and carry through the polymerization operation. The mold is then cooled sufficiently to permit removal of the molded articles. By using material heated almost to the critical temperature, the whole molding process is accelerated because very little heating is needed in the mold to cure the material. Under the previously existing arrangements, a substantial portion of the necessary heat to polymerize the material had to be supplied after the material entered the mold, resulting in excessively long periods between each molding cycle.

The straight nozzle 78 is protected against excessive heating in the same manner as the nozzle 70 is protected against loss of heat by eliminating contact between the mold 77a and the straight nozzle 78 except for a small portion at its lower end. This arrangement prevents drainage of heat from the mold to the nozzle and insures against polymerization of the material before it has been transferred to the mold.

When thermosetting plastic materials are used, the auxiliary feed 80 is unnecessary since the material is worked in a less fluid state and does not have the tendency to work up into the gap 230 (Figure 20) to such a degree that it causes the ram 58 to lock. Further, what material does work into the gap 230 is cleaned out at the end of each stroke by being left in the mold 77a when the ram 58 withdraws.

c. *Extrusion*

Figure 16:
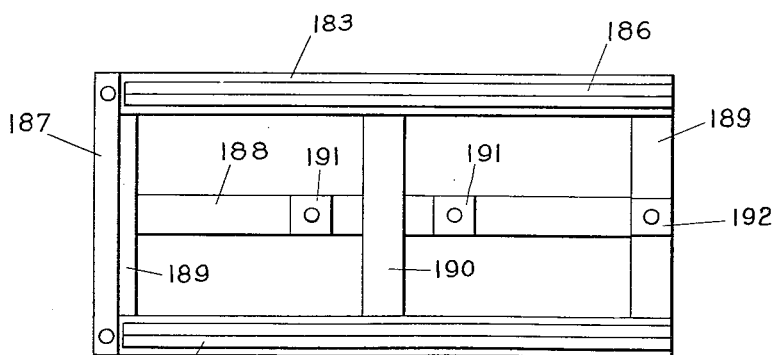
Figure 16 is a top view of the mounting frame for the horizontal feeding mechanism of my improved plastics working machine.

My improved plastics working machine may also be used as an extruder for thermoplastics. When so used, the horizontal feeding mechanism 1 is used along without either the vertical compression chamber 2 or the auxiliary feed 80. To so modify the machine, the bolts 31 are removed permitting the horizontal feeding mechanism 1 to be moved outwardly along the rails 186 and leaving the head 32 attached to the vertical compression chamber 2. The movable bed 193 is then lifted off the rails 186, rotated 90 degrees and reseated on the rails 186 by means of the indexing members 189 (Figure 19). The horizontal feeding mechanism 1 is locked in this position by installation of the bolts 202 which engage the spacer blocks 191 (Figure 16). By means of the same bolts 31, previously used to hold the head 32, a die plate 222, having an opening therethrough of the desired pattern, is mounted to the inward or discharge end of the housing 4.

The screw 40 may also be modified by substitution of a head portion 42 of progressively decreasing pitch, the widest pitch of which is less than that of the pitch on the inward end of the main portion 41 of the screw 40. With this head portion substituted, the material continues to be mixed and compressed throughout the length of the inward housing member 5.

The operation of the horizontal feeding mechanism 1 as an extruder is quite similar to its operation for injection molding of thermoplastics. The material is fed through the hopper 28, kept cool by means of the coolant circulating in opening 105 in the outward housing member 7 and in the coil 106. It is subjected to heating by means of the jackets 100 as it passes through the outward housing member 7 and central housing member 6. It is subjected to further heating by means of the resistance heaters 101 on the inward housing member 5. Coolant is intermittently circulated through the tubes 107, 108 and 109 to control the temperature of the material and prevent scorching. The temperature is raised to the desired degree for extruding by the compressive effect of the screw which is constantly in operation. The pressure generated by the screw serves to force the material out through the die plate 222 to produce the desired extrusion.

d. *Operation in general*

Throughout the operation of the machine, whether or not it is used for thermoplastic or thermosetting plastic materials, the thermocouples 113 and 127, in connection with their associated gauges, provide a constant check on the temperature of the material as it is being processed. Although these thermocouples are described as connected to gauges, it is possible to arrange them, by means of relays and other suitable electrical connections, so that they are enabled to automatically control the application of heat or coolant in response to thermal fluctuations, and to actuate any appropriate warning means if the temperature should vary beyond the limits of a predetermined range.

Whenever the machine is used in connection with a mold such as that indicated by the numerals 77 and 77a, the mold is mounted on the mold bed 142 while it is in retracted or lowered position (Figure 11). The mold is then raised by means of the actuating cylinder 216 in a conventional manner until the end of the nozzle 70 or straight nozzle 78 is seated at the parting line of the mold. The actuating cylinder 216 retains the mold in this position until the injection process, in the case of thermoplastic materials, or the transfer process, in the case of thermosetting plastic materials, is completed. The actuating cylinder 216 then lowers the mold to permit its removal or opening.

Throughout all operations of the machine, both the screws 40 and the ram 58 are subjected to continuous cooling by circulation of a coolant through the tube 119, the central passageway 117 and opening 118 in the screw 40 and the tube 123 and central canal 122 in the ram 58.

The various head portions 42 of the screw 40, each equipped with a helical ridge, replace the conventional smooth, bullet-shaped torpedo normally utilized in this position. The object of the torpedo was to force the material into a channel of thin enough dimensions to insure thorough heating of the material and to insure its continuous movement to prevent scorching. Although the torpedo accomplished this purpose, it greatly reduced the capacity of the machine by materially restricting the quantity of material which could be forced past it. At the same time, the use of a thin passageway to insure proper heating necessitated the application of excessive pressures to move the material. By providing cooling means as well as heating means the danger of scorching is eliminated and the material may be allowed to remain in contact with the heated surfaces a sufficient length of time to insure thorough heating. This permits a screw to be substituted for the torpedo, giving the machine greater capacity. Furthermore, the operating pressure is reduced because there is no longer any necessity for forcing the material through a long, high restricted passageway.

Furthermore, the novel combination of a vertical compression chamber and a screw operated feeding mechanism together with careful temperature control permits my machine to operate continuously with both thermoplastic and thermosetting plastic materials. In the case of thermoplastics the use of the auxiliary feed and the thin top coating of dry material, where used, often permits the use of higher operating temperatures and lower viscosity with a resultant material reduction in operating pressures. This reverses the present trend toward higher operating pressures to obtain greater capacity and swifter operation. In the case of thermosetting plastics, it provides a continuous process without the need for preforms of brickettes or preheaters. It also reduces curing time by injecting the plastic into the mold at a higher temperature.

The timing controls and hydraulic system are preferably so arranged that the full pressure at which the plastic material is driven into the mold is held for only long enough to permit the plastic material to stiffen, or set, and it then is reduced substantially for the balance of the holding period. For example, in a two minute cycle with 2,800 p. s. i. operating pressure, this pressure may be held for 30 seconds and then the ram pressure will be reduced to 50 p. s. i. for the balance of the holding period. In this manner, the wear and tear on the hydraulic system is greatly reduced. This is possible in my machine in view of the very small pressure drop between the ram and the mold, but is probably not possible, or at least less practicable, in other machines wherein a very high ram pressure must be maintained in order to have any pressure on the mold at all.

The speed of operation of my machine, due to the high state of fluidity of the plastic material which can be maintained therein, and its consequent speed of ejection therefrom without requiring excessive pressures, makes it possible to mold a variety of articles which were not formerly thought possible. For example, with my machine it is possible to mold four automobile steering wheels in a single shot from a single point without flow lines appearing, whereas formerly this was not possible. However, the mold is not more complicated than any ordinary compression, transfer or injection mold and any ordinary, automatic or hand means of removing molded parts from the mold may be used.

Particular mention should be made of the fact that because of the high degree of fluidity which can be maintained in the ram cylinder of the machine in the handling of thermoplastic materials, and the consequent speed of ejection therefrom with only moderate pressure on the ram, it is possible to maintain the mold in a cold, or cool, condition during the entire molding cycle. In this way the cooling of the molded parts can be effected much more quickly than with conventional equipment but there still are no flow lines formed in view of the high speed of filling the mold. The precise temperature at which the mold may be maintained will, of course, vary somewhat with the nature of the part being molded and the plastic concerned. However, in general it should be as cold as possible without forming flow lines, and, this will normally be from about 200 degrees Fahrenheit to about 400 degrees Fahrenheit below the temperature of the plastic being molded. For example, in the case of cellulose acetate the mold will be about 270 degrees below the temperature of the plastic mass being molded, and in the case of polystyrene this differential will be about 400 degrees, both in degrees Fahrenheit.

Although the foregoing description has referred to a preferred arrangement by which the discharge end of the screw is replaced to adapt it to different operations as described, it should be understood that this is not believed to be essential and that the essence of this invention may be successively practiced with a one-piece screw of constant pitch throughout its entire length.

It should also be understood that other similar forms of feeders may be used in addition to the screw device 1 herein specifically illustrated, providing only that they are capable of agitating, mixing, heating or cooling and discharging the plastic material all in an accurately controllable manner, and particularly there may be substituted a plasticizer having multiple, interlocked screws whereby the quantity of plastic material delivered in a given number of turns of the screws may be accurately regulated, such as those illustrated in Patents No. 1,990,555 and No. 2,048,286, or there may also be used a double roll device such as that used by the Dow Chemical Company under the name "Plastruder." By any of these means, still utilizing heating and cooling means applied and operated accordingly the principles of my invention as above disclosed, it will be possible to place a ground but otherwise uncompounded resin, or other plastic material, into the feed inlet of the machine and therein mill, mix, knead and otherwise compound it with plasticizers, coloring materials, fillers or other modifiers and then discharge it directly into the ram cylinder for molding. In thus effecting the steps from the uncompounded material to a finished, molded article in a continuous process practiced in a single machine, it is obvious that great savings in costs may be obtained.

Figure 27:
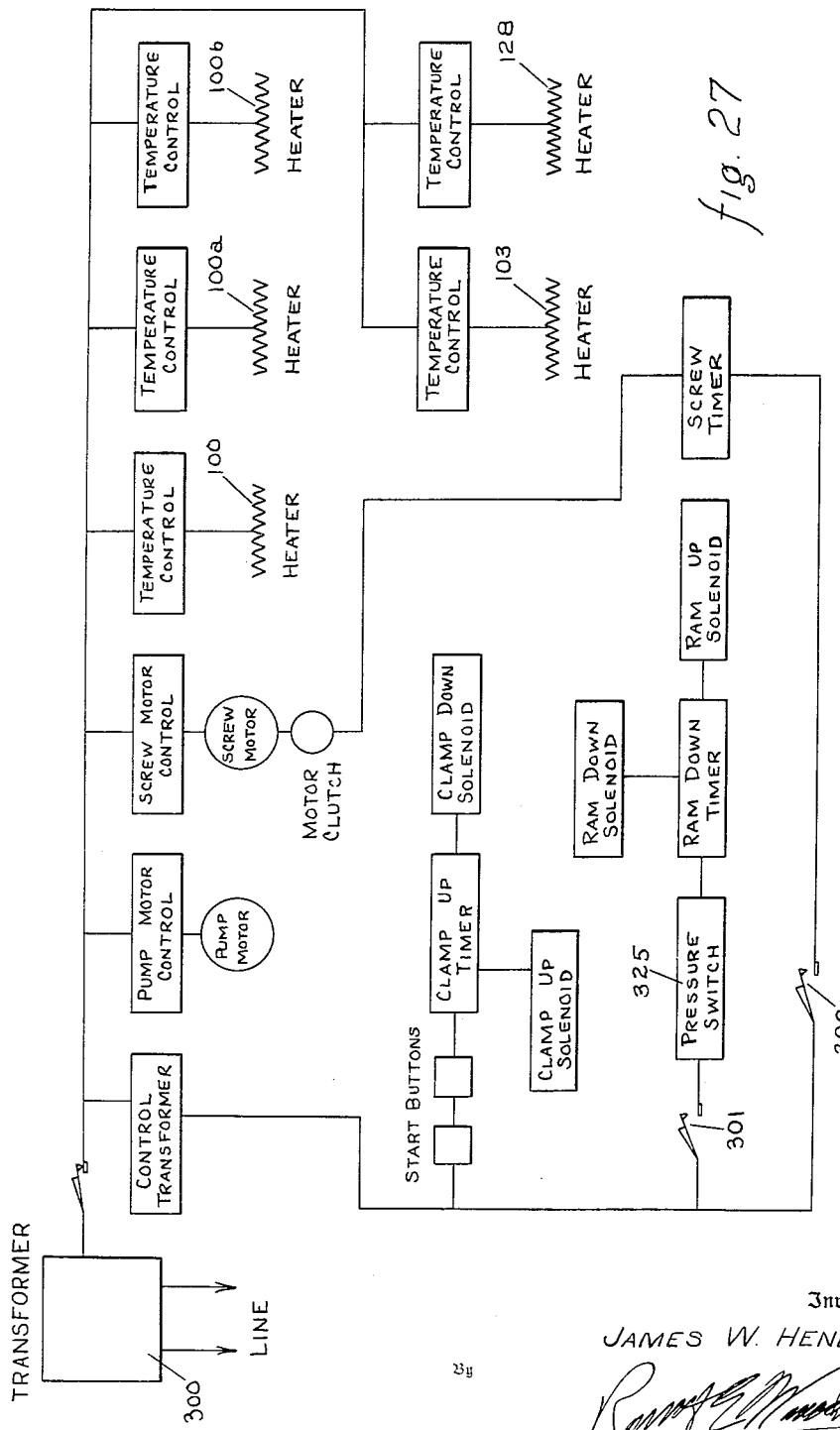
Figure 27 is a schematic illustration of a preferred electrical circuit used in my machine.

Although the electrical and hydraulic circuits have been above correctly stated as of any conventional form to effect the operation desired, in the interest of completeness of disclosure Figures 26 and 27 are provided showing schematically certain preferred circuits and illustrating their operation.

Referring first to the electrical connections shown in Figure 27, a transformer 300 supplies current by any direct connection through a suitable control to the pump motor, likewise through a suitable control to the motor driving the screw and to the several heaters each through a suitable thermostatic, manually regulatable control. The transformer also supplies current through suitable starting switches to a "clamp up solenoid," which controls a valve which in turn controls the flow of hydraulic fluid to raise the ram 216 and by it the platen 142, thence to a timer for controlling the time during which the hydraulic fluid will be so supplied and lastly to a "clamp down solenoid," which control a valve for controlling the hydraulic fluid to lower the said ram and platen. Further, the transformer supplies current through a limit switch 301, which is closed by upward movement of the ram 216, to a "ram down solenoid" which actuates a valve by which the hydraulic fluid causes the ram 58 to move downwardly, thence to the timer for controlling the time during which the ram shall remain down and, finally, to a "ram up solenoid" which controls a valve which in turn controls the hydraulic fluid to return the ram upwardly. Lastly, the transformer 300 supplies current through a limit switch 302 which is closed by upward movement of the ram 58 to screw timer and thence to a screw motor clutch, by which, with the screw motor running continuously, the screw may be caused to start turning when the ram goes up and it continues turning for a period of time determined by the screw timer.

Turning now to the hydraulic circuit, for which a typical circuit is schematically shown in Figure 26, there is first a reservoir 310 with which are associated the pump rotors 311 and 312 operating in association with an intake 313. Oil under pressure goes from the rotor 311 past the pressure control valve 314 to the valve 315. Here, actuation of the "clamp up solenoid" moves the valve to direct fluid through the conduit 316 to the lower ends of each of the "kicker" cylinders 317 and 318. Neither of these kicker cylinders are shown in the other drawings, and are not essential, but their use as described immediately hereinafter following will increase the speed of operation of the machine. As these move upwardly, attached to the platen 142 in any convenient manner, the ram 216 is pulled upwardly, drawing fluid into the chamber 320 through a convenient port 321a in the valve housing 321. These stop a short distance from the full mold closed position, whereupon a pressure operated valve 322, operating by the pressure build-up occurring in the line 323 when the kicker rams stop, opens to permit the pressure from a two thousand p. s. i. piston pump 324, operated from the same motor as the pump rotors 311 and 312, to enter the chamber 320 and complete the raising of the platen 142 under high pressure This final raising closes the limit switch 301 and the pressure build-up occurring at the upper end of the stroke of the ram 216 actuates the pressure switch 325 to initiate the ram operation. The pressure control valves 343 and 344 determine the pressure in the line 345.

This switch 325 actuates the "ram down solenoid" and thereby operates the valve 326 to direct hydraulic fluid from the line 330, which it reaches through the manually set volume control 331, to the line 332 and thence to the upper side of the ram operating cylinder 214. The ram 58 is thus forced downwardly, held for a predetermined period by the "ram down timer" and then, the "ram up solenoid" is actuated the valve 326 turns off the line 332 and permits the fluid to escape through line 333, through said valve 326 through line 337 to the valve 334 and the cooler 335 back to the tank. The "clamp down solenoid" is then actuated to shut off the conduit 316 from the pressure line and permit hydraulic fluid to return back through the line 316 to the valve 315 and thence back into the tank 310. If desired to make the downward return of the ram 216 more positive, the valve 315, instead of shutting off the pressure line completely, may direct it into a line 340 to the top of the kicker cylinders.

If a larger volume of hydraulic fluid is needed to secure more rapid action of the ram 58, the second pump rotor 312 may be turned by hand from mere recycling through the valve 336 back to the tank, into the conduit 337 to join with fluid from the line 330 in entering the valve 326 and thence flowing to the ram cylinder 214. The pressure control valve 341 controls the pressure developed in the line 432.

I have invented and described a machine and method capable of providing a continuous transfer to thermosetting plastic materials or of continuous injection of thermoplastic materials or of being used as a thermoplastic materials extruder. Many minor changes in the form, structure and operation of my machine, or the method effected by it, may be made by those acquainted with the problems and design of plastics working machines but it is intended that each of these modifications will be included in the hereinafter appended claims, unless the claims, by their express language, provides otherwise.

I claim:

1. The method of working, in a machine having a restricted chamber and a ram passing therethrough for compressing and ejecting the material therein, a synthetic, organic thermoplastic material at a working temperature slightly below the temperature at which said material will decompose, the steps therein including: placing a fluent charge of said material in said restricted chamber at said working temperature; placing a predetermined quantity of cold, dry, pulverulent material, chemically similar to the material constituting said fluent charge, above the material constituting said fluent charge and forming same in a thin layer on the surface of said fluent charge and permitting same to absorb heat therefrom; maintaining said ram at a temperature less than that of said fluent charge and permitting it to bear on said dry layer for compressing and ejecting said fluent charge of material and allowing a portion of said dry material to be forced between said ram and the walls of said restricted chamber to form a sealing ring of said dry material between said ram and the walls of said restricted chamber.

2. The method of working a synthetic, organic thermoplastic material at a working temperature slightly below the temperature at which said material will decompose as described in claim 1 wherein the air above said fluent charge is made turbulent as said quantity of cold material enters said restricted chamber to evently distribute said quantity of cold material over the surface of said fluent charge.

3. In a method of working synthetic, organic thermosetting materials, the steps comprising: moving said material along a predetermined restricted path; mixing and compressing said material as it is moved along said path; heating said material as it is moved along said path to a temperature substantially below its polymerization temperature; moving said heated material into a restricted accumulation area and accumulating said heated material in said area until a quantity of predetermined size has been accumulated; heating said material while in said accumulation area to a working temperature close to, but remaining below, the temperature at which it will polymerize; continuously agitating said material while in said accumulation area; intermittently and rapidly discharging said accumulated material into a second restricted area; compressing and forcing said material from said second path at said working temperature into a mold; heating said material in said mold to the polymerization temperature; completing said polymerization and removing the cured material from said mold.

4. In a method of ejecting under pressure a substantially plasticized charge of synthetic, organic, thermoplastic material from a confined zone, the steps including: interposing between a free surface of said plastic material and the leading surface of a pressure imposing ram a layer of substantially unplasticized thermoplastic material compatible with said charge, urging said ram against said layer and said charge to impose pressure thereon for ejecting a portion thereof from said confined zone and simultaneously cooling said ram to prevent the heating of said layer to the temperature of said charge whereby to prevent its material plasticizing; limiting the quantity of said charge ejected from said confined zone to a portion of said charge not contacting said layer; withdrawing said ram and placing a further charge of substantially plasticized thermoplastic material into said confined zone above said layer and repeating the cycle, whereby said layer will now be between two charges of substantially plasticized thermoplastic material and will absorb enough heat from each thereof to become itself similarly plasticized sufficiently to amalgamate with each of said adjacent charges and substantially to disappear as a separately identifiable entity either prior to, or concurrently with, its ejection from said confined zone.

5. The method of placing under pressure a quantity of synthetic, organic, thermoplastic material, at such a temperature as to be in plastic condition, and ejecting only a part thereof from said confined space at any one time, comprising the steps: spreading over the upper surface of said plastic material a quantity of finely divided cold material compatible with said plastic material and subsequently applying to the upper surface of said layer the leading surface of a pressure imposing ram, withdrawing said ram, placing a new quantity of thermoplastic material into said confined zone and above said layer, and repeating said cycle, whereby the portion of each charge of finely divided cold material which is not forced between said ram and said walls becomes overlain with a further quantity of hot thermoplastic material, thereby causing it to become plasticized and substantially amalgamated with the remainder of said material before ejection from said confined zone.

6. The method of applying a pressure to a quantity of a synthetic, organic, thermoplastic material at sufficiently elevated working temperature that it is thoroughly plasticized, which includes applying a vertically reciprocable ram to a quantity thereof in a confined zone, the steps including: retracting said ram sufficiently to provide a dispersion zone above said thermoplastic material; releasing a charge of finely divided cold material chemically and physically compatible with material constituting said thermoplastic material into said dispersion zone and allowing same to settle in a thin layer on the surface of said thermoplastic material; permitting said ram to bear on said finely divided layer for compressing and ejecting a portion of said thermoplastic material under pressure from said confined zone, and allowing said finely divided material to be partially plasticized and forced between said ram and the walls of said restricted chamber to form a ring thereof between said ram and the walls of said restricted chamber of sufficient density to prevent the entry between said ram and said walls of any of the said quantity of plasticized thermoplastic material but of insufficient firmness to prevent relative motion between the said ram and said walls.

7. The method of applying a pressure to a quantity of a synthetic, organic, thermoplastic material at sufficiently elevated working temperature that it is thoroughly plasticized, which includes applying a vertically reciprocable ram to a quantity thereof in a confined zone, the steps including: retracting said ram sufficiently to provide a dispersion zone above said thermoplastic material; releasing a charge of finely divided cold material identical with said thermoplastic material into said dispersion zone and causing same to settle in a thin layer on the surface of said thermoplastic material; permitting said ram to bear on said finely divided layer for compressing and ejecting a portion of said thermoplastic material under pressure from said confined zone, partially plasticizing said finely divided material and allowing it to be forced between said ram and the walls of said restricted chamber to form a ring thereof between said ram and the walls of said restricted chamber of sufficient density to prevent the entry between said ram and said walls of any of the said quantity of plasticized thermoplastic material but of insufficient firmness to prevent relative motion between the said ram and said walls.

8. The method of applying a pressure to a quantity of a synthetic, organic thermoplastic material at sufficiently elevated working temperature that it is thoroughly plasticized, which includes applying a vertically reciprocable ram to a quantity thereof in a confined zone, the steps including; retracting said ram sufficiently to provide a dispersion zone above said thermoplastic material; releasing a charge of finely divided cold material identical with said thermoplastic material into said dispersion zone and causing same to settle in a thin layer on the surface of said thermoplastic material; permitting said ram to bear on said finely divided layer for compressing and ejecting a portion of said thermoplastic material under pressure from said confined zone, partially plasticizing said finely divided material and allowing it to be forced between said ram and the walls of said restricted chamber to form a ring thereof between said ram and the walls of said restricted chamber of sufficient density to prevent the entry between said ram and said walls of any of the said quantity of plasticized thermoplastic material but of insufficient firmness to prevent relative motion between the said ram and said walls, withdrawing said ram, placing a new quantity of thermoplastic material into said confined zone, and repeating said cycle, whereby the portion of each charge of finely divided cold material which is not forced between said ram and said walls becomes overlain with a further quantity of hot thermoplastic material, thereby causing it to become plasticized and substantially amalgamated with the remainder of said material before ejection from said confined zone.

9. In a method of working a synthetic organic plastic material, the steps therein comprising: intermittently moving a supply of dry comminuted plastic material along a predetermined, restricted first path; mixing and compressing said material as it is moved along said first path and heating said material as it is moved along said first path to a working temperature but holding said material below the temperature at which it will become unsuitable for molding purposes; intermittently discharging said material from said first path into a second restricted path; cooling said material in said first path when it is not moving along said first path to prevent its exceeding said working temperatures; preventing cooling of said material in said second path to such a point that it will be in improper condition for molding at the point of discharge therefrom; placing onto the surface of said material a thin layer of pulverulent material similar to said synthetic organic plastic material and subsequently applying pressure to the mass comprising said pulverulent material and said synthetic organic plastic material for forcing a quantity thereof along said path into a mold.

References Cited in the file of this patent

UNITED STATES PATENTS

| | | |
|---|---|---|
| 2,207,426 | Bailey | July 9, 1940 |
| 2,244,565 | Nast | June 3, 1941 |
| 2,335,371 | Willis | Nov. 30, 1943 |
| 2,340,834 | Hanson | Feb. 1, 1944 |
| 2,372,177 | Conner | Mar. 27, 1945 |
| 2,537,182 | Bertrand | Jan. 9, 1951 |

FOREIGN PATENTS

| | | |
|---|---|---|
| 422,232 | Great Britain | Jan. 8, 1935 |